United States Patent
Omoshiki et al.

(10) Patent No.: US 7,919,425 B2
(45) Date of Patent: *Apr. 5, 2011

(54) PHOTOCATALYST-COATED BODY AND PHOTOCATALYTIC COATING LIQUID FOR THE SAME

(75) Inventors: Koji Omoshiki, Chigasaki (JP); Junji Kameshima, Fujisawa (JP); Yoji Takaki, Chigasaki (JP); Makoto Hayakawa, Chigasaki (JP); Mitsuyoshi Kanno, Chigasaki (JP)

(73) Assignee: Toto Ltd., Fukuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/383,840

(22) Filed: Mar. 27, 2009

(65) Prior Publication Data

US 2009/0286673 A1 Nov. 19, 2009

Related U.S. Application Data

(63) Continuation-in-part of application No. 12/079,417, filed on Mar. 26, 2008.

(60) Provisional application No. 61/040,151, filed on Mar. 28, 2008.

(30) Foreign Application Priority Data

| Mar. 28, 2008 | (JP) | ................................. 2008-087837 |
| Mar. 28, 2008 | (JP) | ................................. 2008-087840 |
| Sep. 24, 2008 | (JP) | ................................. 2008-244432 |
| Dec. 26, 2008 | (JP) | ................................. 2008-331910 |

(51) Int. Cl.
*B01J 31/06* (2006.01)

(52) U.S. Cl. ...................................................... 502/159

(58) Field of Classification Search ........................ None
See application file for complete search history.

(56) References Cited

U.S. PATENT DOCUMENTS

| 5,616,532 | A | * | 4/1997 | Heller et al. .................. 502/242 |
| 6,013,372 | A | | 1/2000 | Hayakawa et al. |
| 6,071,606 | A | | 6/2000 | Yamazaki et al. |
| 6,221,498 | B1 | | 4/2001 | Takahama et al. |
| 6,228,480 | B1 | | 5/2001 | Kimura et al. |
| 6,491,883 | B2 | | 12/2002 | Mori et al. |
| 6,906,001 | B1 | | 6/2005 | Escaffre et al. |
| 2005/0277543 | A1 | | 12/2005 | Takahashi et al. |
| 2006/0264525 | A1 | * | 11/2006 | Ohwaki et al. .................. 522/18 |

FOREIGN PATENT DOCUMENTS

| JP | 11-140432 A | 5/1999 |
| JP | 11-169727 | 6/1999 |
| JP | 11-169727 A | 6/1999 |
| JP | 2001286766 | * 2/2001 |
| JP | 2001-152051 A | 6/2001 |
| JP | 2001-179091 A | 7/2001 |
| JP | 2001-232215 A | 8/2001 |
| JP | 2002-053772 A | 2/2002 |
| JP | 2004-359902 | 12/2004 |
| JP | 2004-359902 A | 12/2004 |
| JP | 2005-082637 | 3/2005 |
| JP | 2005-082637 A | 3/2005 |
| JP | 2005-179686 | 7/2005 |
| JP | 2005-199607 A | 7/2005 |
| JP | 2006-045419 A | 2/2006 |
| JP | 2006-111680 A | 4/2006 |
| JP | 2007-055207 A | 3/2007 |
| JP | 2008-264747 | 11/2008 |
| JP | 2008-264777 | 11/2008 |
| WO | 97/00134 A1 | 1/1997 |
| WO | 03/033144 A1 | 4/2003 |

OTHER PUBLICATIONS

Nissan Chemical America Corporation, Technical information on Snowtex 50, http://www.nissanchem-usa.com/snowtex.php., pp. 1-9.
Nihon Parkerrizing Co., Ltd., Photocatalyst Coating Material (Paltitan Series), pp. 1-4., http://www.technopedia.jp/list/enseeds/e 093.html.
Isihara Sangyo Co., Technological Information on STS-21, Photocatalytic Titanium Dioxide, http://www20.inetba.com/ishiharacorpusa/item416092.ctlg.
Tayca Corp Technology, Photocalystic Titanium Dioxide, pp. 1-2, http://tayca.co.jp/english/file/04/08 03.html.

\* cited by examiner

*Primary Examiner* — Melvin C Mayes
*Assistant Examiner* — Stefanie Cohen
(74) *Attorney, Agent, or Firm* — Carrier Blackman & Associates, P.C.; Joseph P. Carrier; William D. Blackman

(57) ABSTRACT

A photocatalyst-coated body and a photocatalytic coating liquid which exert an excellent weather resistance, harmful gas decomposability, and other desired characteristics (such as transparency and film strength), while preventing erosion of the substrate are provided. The photocatalyst-coated body comprises a substrate and a photocatalytic layer provided on the substrate. The photocatalytic layer comprises photocatalytic particles and inorganic oxide particles, and has interstices between the particles in the layer.

47 Claims, No Drawings

PHOTOCATALYST-COATED BODY AND PHOTOCATALYTIC COATING LIQUID FOR THE SAME

CROSS-REFERENCES TO RELATED APPLICATIONS

This application is a continuation-in-part of U.S. patent application Ser. No. 12/079,417 filed on Mar. 26, 2008, claims the benefit of U.S. Provisional Application No. 61/040,151 filed Mar. 28, 2008, and claims priorities to Japanese Patent Application No. 2008-87837 filed Mar. 28, 2008, Japanese Patent Application No. 2008-87840 filed Mar. 28, 2008, Japanese Patent Application No. 2008-244432 filed Sep. 24, 2008, and Japanese Patent Application No. 2008-331910 filed Dec. 26, 2008. The entire disclosures of these applications are incorporated herein by reference.

BACKGROUND OF THE INVENTION

1. Field of the Invention

The present invention relates to a photocatalyst-coated body excellent in high weather resistance, hydrophilicity, harmful gas decomposability, and various coating characteristics in applications of exterior materials of buildings and the like; and a photocatalytic coating liquid for the same.

2. Description of Related Art

In recent years, a photocatalyst such as titanium oxide is being used for various applications such as exterior materials for buildings. By utilizing the photocatalyst, it is possible to decompose various harmful substances with light energy or to hydrophilize the substrate surface coated with a photocatalyst and easily wash away the stain adhered on the surface with water. As a technique to obtain the photocatalyst-coated body coated with such a photocatalyst, the followings are known.

A technique to impart hydrophilicity to the surface of a synthetic resin and the like using an aqueous dispersion comprising photocatalytic metal oxide particles, colloidal silica, and a surfactant is known (For example, Japanese Patent Laid-Open Publication No. H11-140432). In this technique, hydrophilicity is enhanced by adding the surfactant in an amount as large as 10 to 25% by weight. In addition, white turbidity due to the diffuse reflection of light is prevented by making the film thickness 0.4 µm or less.

A technique to obtain a photocatalytic body by forming a coated film comprising silica sol as a binder component and photocatalytic titanium dioxide on a substrate is also known (For example, Japanese Patent Laid-Open Publication No. H11-169727). In this technique, the amount of silica sol to be added is claimed to be 20 to 200 weight parts in terms of $SiO_2$ relative to titanium dioxide, the content of titanium dioxide being high. In addition, the particle size of the silica sol is as small as 0.1 to 10 nm.

A technique to form a photocatalytic coating film which transmits 50% or more of light of a wavelength of 500 nm and blocks 80% or more of light of a wavelength of 320 nm using a photocatalytic paint is also known (For example, Japanese Patent Laid-Open Publication No. 2004-359902). In this technique, a partially hydrolyzed product of organosiloxane is used as a binder of the photocatalytic paint, the preferred amount of which to be added is claimed to be 5 to 40% by mass of the total paint composition.

In the meantime, there has been known a problem that, when the substrate of the photocatalytic layer is constructed with an organic material, the organic material is decomposed or deteriorates by photocatalytic activity of the photocatalyst. In order to cope with this problem, a technique is known to protect the substrate carrier from deterioration by photocatalytic action by providing an adhesive layer of a silicone-modified resin and the like between the photocatalytic layer and the carrier (For example, see WO 97/00134).

SUMMARY OF THE INVENTION

The present inventors have recently found that, by constructing a photocatalytic layer with a specific composition comprising photocatalytic particles and inorganic oxide particles in a specific mass ratio and comprising no or as small amount as possible of hydrolyzable silicone, it is possible to provide a photocatalyst-coated body excellent in high weather resistance, hydrophilicity, harmful gas decomposability, and various desired coating characteristics (such as transparency and film strength), while preventing erosion of the substrate (especially the organic substrate).

Thus, the purpose of the present invention is to provide a photocatalyst-coated body excellent in high weather resistance, hydrophilicity, harmful gas decomposability, and various desired coating characteristics (such as transparency and film strength), while preventing erosion of the substrate (especially the organic substrate); and a photocatalytic coating liquid for the same.

According to the present invention, there is provided a photocatalyst-coated body comprising a substrate and a photocatalytic layer provided on the substrate, the photocatalytic layer comprising photocatalytic particles, and inorganic oxide particles and, the photocatalytic layer having interstices between the particles in the layer.

According to the present invention, there is further provided a photocatalytic coating liquid for use in producing the photocatalyst-coated body according to claim 1, the photocatalytic coating liquid comprising:

a solvent, photocatalytic particles having an average particle diameter of 10 nm or more and 100 nm or less in an amount of 1 part by mass or more and 5 parts by mass or less, inorganic oxide particles in an amount of more than 85 parts by mass and 99 parts by mass or less, and a hydrolyzable silicone in an amount of 0 part by mass or more and less than 10 parts by mass in terms of silica, provided that the photocatalytic particles, the inorganic oxide particles, and the hydrolyzable silicone amount to 100 parts by mass in terms of silica.

DETAILED DESCRIPTION OF THE INVENTION

Photocatalyst-Coated Body

The photocatalyst-coated body according to the present invention is a photocatalyst-coated body comprising a substrate and a photocatalytic layer provided on the substrate, the photocatalytic layer comprising photocatalytic particles and inorganic oxide particles, and the photocatalytic layer having interstices between the particles in the layer.

By constructing the photocatalytic layer with photocatalytic particles and inorganic oxide particles as main components and positively providing interstices between the particles in the photocatalytic layer, air permeability to the photocatalytic layer is improved, while it becomes easier to allow decomposable substances such as NOx gas in outside air or gases such as oxygen and water vapor necessary to generate active oxygen to undergo an action effectively in the vicinity of the photocatalytic particles. Accordingly, gas decomposition characteristics of the photocatalyst such as excellent NOx decomposition function are obtained.

In addition to the aforementioned construction, it is preferable that the photocatalyst-coated body is constructed so that the photocatalytic layer comprises the photocatalytic particles in an amount of more than 1 part by mass and less than 5 parts by mass, the inorganic oxide particles in an amount of more than 85 parts by mass and less than 99 parts by mass, and the dried substance of the hydrolyzable silicone in an amount of 0 part by mass or more and less than 10 parts by mass, provided that the photocatalytic particles, the inorganic oxide particles, and the hydrolyzable silicone amount to 100 parts by mass in terms of silica.

That is, it is considered that considerably lower content of the photocatalytic particles than that of the inorganic oxide particles in the photocatalytic layer (preferably more than 1 part by mass and less than 5 parts by mass, more preferably 2 parts by mass or more and less than 5 parts by mass, further more preferably 2 parts by mass or more and 4.5 part by mass or less relative to the total amount of 100 parts by mass of the photocatalytic particles, inorganic oxide particles and hydrolyzable silicone) enables to minimize the direct contact of the photocatalytic particles with the substrate, making erosion of the substrate (especially the organic substrate) less likely to occur. In addition, it is considered that deterioration of the substrate by ultraviolet light can be reduced by reducing the dose of the ultraviolet light reaching the substrate since the photocatalyst itself absorbs the ultraviolet light.

At the same time, with this construction, it becomes possible to obtain a photocatalyst-coated body excellent in harmful gas decomposability and various desired coating characteristics (such as transparency and film strength), while preventing erosion of the substrate (especially the organic substrate). First of all, since the amount of the inorganic oxide particles is as large as preferably more than 85 parts by mass and less than 99 parts by mass, the photocatalytic layer is essentially composed of two types of the particles, photocatalytic particles and inorganic oxide particles, resulting in existence of plentiful interstices between the particles. If a large amount of hydrolyzable silicone which is commonly used as a binder of the photocatalytic layer is used, it is considered that the gas diffusion is hindered because such interstices between the particles are densely filled with the hydrolyzable silicone. On the other hand, since the photocatalytic layer of the present invention does not comprise the dried substance of the hydrolyzable silicone or, even if it comprises some, the content is preferably less than 10 parts by mass relative to the total amount of 100 parts by mass of the photocatalytic particles, the inorganic oxide particles, and the dried substance of the hydrolyzable silicone in terms of silica, interstices between the particles can be sufficiently maintained and secured, and thus attain a structure which facilitates diffusion of the harmful gases such as NOx and SOx into the photocatalytic layer. As a result, it is considered that the harmful gases effectively contact with the photocatalytic particles and are decomposed by the photocatalytic activity. Considering the aforementioned action and effect, it is the most preferable that the amount of the dried substance of the hydrolyzable silicone in terms of silica is substantially 0 part by mass.

In the aforementioned construction, especially the photocatalytic particles can exert photocatalytic decomposition function such as a function to decompose NOx in an amount as small as preferably more than 1 part by mass and less than 5 parts by mass. Therefore, it is considered that the photocatalyst-coated body excellent in weather resistance, hydrophilicity, harmful gas decomposability and various desired coating characteristics (such as transparency and film strength) is realized, while preventing erosion of the substrate (especially the organic substrate). Accordingly, the photocatalytic layer of the present invention can exert excellent durability even with high ultraviolet dose and under hot and humid weather conditions in tropical and subtropical regions especially at low latitudes, at the same time as the photocatalytic decomposition function.

The average particle diameter of the photocatalytic particles is preferably 10 nm or more and 100 nm or less, more preferably 10 nm or more and 60 nm or less. The average particle diameter is calculated as a number average value of the measured length of arbitrary 100 particles within a visual field of a scanning electron microscope with 200,000× magnification. Although the most preferred shape of the particle is perfect sphere, approximate circle or ellipse may be acceptable, in which case the length of the particle is approximately calculated as ((major axis+minor axis)/2). In this range, gas permeation amount in the photocatalytic layer, specific surface area for sufficient gas decomposition activity, monocrystalline size for sufficient photocatalytic activity of the particle, and various coating film characteristics such as transparency and weather resistance can be exerted in a balanced manner. Furthermore, making the average particle diameter of the photocatalytic particles 10 nm or more and 100 nm or less, more preferably 10 nm or more and 60 nm or less can be suitably combined with each of the constituent elements of the present invention described up to here, and new effects mentioned above may also be exerted without hindering the effects of the constituent elements.

As the photocatalytic particles, particles of metal oxide such as titanium oxide ($TiO_2$), ZnO, $SnO_2$, $SrTiO_3$, $WO_3$, $Bi_2O_3$, and $Fe_2O_3$ are exemplified. Any metal oxides exemplified here can be suitably combined with each constituent mentioned above.

As the photocatalytic particles, titanium oxide particles are preferable. Titanium oxide has better water resistance compared with ZnO and exerts photocatalytic function such as gas decomposition by the light of the wavelength of 380 nm to 420 nm which is included sufficiently in sunlight compared with $SnO_2$. Furthermore, microparticles of a nanometer order of titanium oxide are more easily available than $SrTiO_3$, therefore the specific surface area is large and practically sufficient photocatalytic activity is easily available. Furthermore, due to its larger bandgap compared with $WO_3$, $Bi_2O_3$, and $Fe_2O_3$, titanium oxide has a sufficient oxidation power, prevents recoupling of conductive electron and positive hole after photoexcitation, and has activation energy sufficient for gas decomposition. In addition, titanium oxide is harmless, chemically stable, and available at low cost. In addition, due to its high bandgap energy, titanium oxide needs ultraviolet light for photoexcitation and does not absorb visible light in the process of photoexcitation, resulting in no coloration by complementary color component.

Using titanium oxide particles as the photocatalytic particles can be suitably combined with each of the constituent elements of the present invention described up to here, and new effects mentioned above may also be exerted without hindering the effects of the constituent elements.

As the photocatalytic particles, anatase-type titanium oxide is preferable among titanium oxide particles. Anatase-type titanium oxide has an oxidation power stronger than rutile-type titanium oxide and exerts stronger photocatalytic function such as gas decomposition. Furthermore, using anatase-type titanium oxide particles as the photocatalytic particles can be suitably combined with each of the constituent elements of the present invention described up to here, and new effects mentioned above may also be exerted without hindering the effects of the constituent elements.

It is preferable that Cu component is further present in the photocatalytic layer. Cu itself has excellent antifungal characteristics and excellent adsorption characteristics for harmful gases and acts on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide. Furthermore, making Cu present in the photocatalytic layer can be suitably combined with each of the constituent elements of the present invention described up to here, and new effects mentioned above may also be exerted without hindering the effects of the constituent elements.

It is preferable that Cu component is supported on the photocatalytic particles. The embodiment in which not only Cu is present in the photocatalytic layer but also is positively supported on the photocatalytic particles can further enhance the effect of Cu to act on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide. Furthermore, making Cu positively supported on the photocatalytic particles can be suitably combined with each of the constituent elements of the present invention described up to here, and new effects mentioned above may also be exerted without hindering the effects of the constituent elements.

It is preferable that both of the Cu component and the Ag component are present in the photocatalytic layer. Presence of both of Cu and Ag in the photocatalytic layer not only exerts the excellent antifungal characteristics of Cu and the excellent antibacterial characteristics of Ag simultaneously, but substantially increases the decomposition activity of the photocatalyst. Although the mechanism is not clear at present, mutual interactions among the photocatalytic particles, Ag, and Cu are presumably correlated. Larger effect is exerted if the photocatalyst is a photocatalyst having intrinsically strong oxidation power, such as titanium oxide, especially anatase-type titanium oxide. Furthermore, making both of Cu and Ag present in the photocatalytic layer can be suitably combined with each of the constituent elements of the present invention described up to here, and new effects mentioned above may also be exerted without hindering the effects of the constituent elements.

It is preferable that both of the Cu component and the Ag component are supported on the photocatalytic particles. The embodiment in which not only Cu and Ag are present in the photocatalytic layer but also both of Cu and Ag are supported on the photocatalytic particles can further enhance the effect of Cu and Ag to act on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide. Furthermore, making both of Cu and Ag positively supported on the photocatalytic particles can be further suitably combined with each of the constituent elements of the present invention described up to here, and new effects mentioned above may also be exerted without hindering the effects of the constituent elements.

As the inorganic oxide particles in the photocatalytic layer, for example, particles of single oxide such as silica, alumina, zirconia, ceria, yttria, boronia, magnesia, calcia, ferrite, iron oxide, amorphous titania, hafnia, tin oxide, manganese oxide, niobium oxide, nickel oxide, cobalt oxide, indium oxide, lanthanum oxide, barium oxide, etc.; or complex oxide such as aluminosilicate, barium titanate, calcium silicate, etc. can be suitably used.

It is considered that mixing the inorganic oxide particles can moderately decrease the amount of the photocatalyst and minimize the direct contact of the photocatalytic particles with the substrate to the minimum, while securing the gas permeability in the photocatalytic layer, thereby making the erosion of the substrate (especially the organic substrate) less likely to occur. In addition, it is considered that deterioration of the substrate by ultraviolet light can be reduced by reducing the dose of the ultraviolet light reaching the substrate since the photocatalyst itself absorbs the ultraviolet light.

Furthermore, using the aforementioned inorganic oxide particles can be suitably combined with each of the constituent elements of the present invention described up to here, and new effects mentioned above may also be exerted without hindering the effects of the constituent elements.

As the inorganic oxide particles in the photocatalytic layer, silica is the most preferable. Mixing silica increases the hydrophilicity of the photocatalytic layer, and the photocatalytic layer being washed by with water or rainwater effectively prevents the stain adhered to the surface from decreasing the decomposition function of the photocatalyst. This preventive effect is especially enhanced if the photocatalyst is a photocatalyst having intrinsically strong oxidation power, such as titanium oxide, especially anatase-type titanium oxide. Furthermore, using silica particles as the inorganic oxide particles can be suitably combined with each of the constituent elements of the present invention described up to here, and new effects mentioned above may also be exerted without hindering the effects of the constituent elements.

As for the inorganic oxide particles in the photocatalytic layer, the number average particle diameter calculated by the measurement of the length of arbitrary 100 particles within a visual field of a scanning electron microscope with 200,000× magnification is preferably 5 nm or more and less than 40 nm, more preferably more than 5 nm and 20 nm or less.

By using the inorganic oxide particles of the average particle diameter of less than 40 nm, more preferably 20 nm or less, the gas permeability in the photocatalytic layer and gas decomposition reactivity is increased, and the abrasion resistance is increased.

Furthermore, making the inorganic oxide particles have a number average particle diameter of 5 nm or more and less than 40 nm, more preferably more than 5 nm and 20 nm or less, can be suitably combined with each of the constituent elements of the present invention described up to here, and new effects mentioned above may also be exerted without hindering the effects of the constituent elements.

The photocatalytic layer may comprise a surfactant as an optional component. The surfactant used in the present invention may be comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles, and the hydrolyzable silicone. One of the effects of the surfactant is leveling property to the substrate. In applications where the leveling effect is necessary, such as coating in a large area, amount of the surfactant may be determined in the aforementioned range as needed depending on the combination of the coating liquid and the substrate. The lower limit in this case is preferably 0.1 part by mass relative to the total amount of 100 parts by mass of the photocatalytic particles, the inorganic oxide particles, and the hydrolyzable silicone. Although the surfactant is an effective component to improve the wettability of the photocatalytic coating liquid, it is equivalent to the inevitable impurity which no longer contributes to the effect of the photocatalyst-coated body of the present invention in the photocatalytic layer formed after applying and drying. Therefore, the upper limit should be less than 10 parts by mass, preferably less than 8 parts by mass, more preferably 6 parts by mass or less, relative to the total amount of 100 parts of the photocatalytic particles, inorganic oxide particles, and the hydrolyzable silicone. That is, the surfactant may be used in the aforementioned range of the amount depending on the wettability required for the photocatalytic coating liquid. It is most preferable that the surfactant is virtually or definitely not comprised in applications where the wettability is not required. The surfactant to be used may be selected from nonionic surfactant, anionic surfactant, cationic surfactant, and amphoteric surfactant as needed considering the dispersion stability of the photocatalyst and the inorganic oxide particles and the wettability when applied on the intermediate layer. Among these a nonionic surfactant is especially preferable, among which more preferable are ether-type nonionic surfactant, ester-type nonionic surfactant, polyalkylene glycol-type nonionic surfactant, fluorine-type nonionic surfactant, and silicone-based nonionic surfactant.

Furthermore, making the surfactant used in the present invention be comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles and the hydrolyzable silicone can be suitably combined with each of the constituent elements of the present invention described up to here, and new effects mentioned above may also be exerted without hindering the effects of the constituent elements.

It is preferable that the photocatalytic layer has a film thickness of 0.5 μm or more and 3.0 μm or less, more preferably 1.0 μm or more and 2.0 μm or less. By using the photocatalytic layer of the film thickness of 0.5 μm or more, more preferably 1.0 μm or more, weather resistance is increased because the ultraviolet light reaching the interface of the photocatalytic layer and the substrate is sufficiently attenuated. In addition, harmful gas decomposability is also increased because amount of the photocatalytic particles, the content of which is lower than the inorganic oxide particles, can be increased in the direction of the film thickness. Furthermore, excellent characteristics in transparency and film strength can be attained by using the photocatalytic layer of the film thickness of 3.0 μm or less, more preferably 2.0 μm or less.

Furthermore, making the film thickness of the photocatalytic layer 0.5 μm or more and 3.0 μm or less, more preferably 1.0 μm or more and 2.0 μm, can be suitably combined with each of the constituent elements of the present invention described up to here, and new effects mentioned above may also be exerted without hindering the effects of the constituent elements.

The photocatalytic layer may further comprise a hydrolyzed condensation-polymerization product of titanium alkoxide or a derivative of titanium alkoxide as an optional component in an amount of 0 part by mass or more and less than 10 parts by mass, preferably 0 part by mass or more and less than 8 parts by mass, more preferably less than 6 parts by mass, in terms of titanium dioxide.

If the photocatalytic layer comprises the hydrolyzed condensation-polymerization product of titanium alkoxide or the derivative of titanium alkoxide in an amount as small as less than 10 parts by mass, preferably less than 8 parts by mass, more preferably less than 6 parts by mass, in terms of titanium dioxide, abrasion resistance slightly increases and curing of the photocatalytic layer may be expected in shorter time after coating compared with the hydrolyzable silicone. However, it is preferable that the interstices between the particles of the photocatalytic layer are sufficiently maintained in order to take advantage of the photocatalytic gas decomposition characteristics of the present invention such as the excellent ability to decompose NOx. If the hydrolyzed condensation-polymerization product of titanium alkoxide or the derivative of titanium alkoxide is used in an amount as large as 10 parts by mass or more in terms of titanium dioxide, it is considered that such interstices between the particles are densely filled, similarly to the case where a large amount of a hydrolyzable silicone commonly used as a binder for the photocatalytic layer is used, resulting in prevention of the diffusion of gases. On the other hand, since the photocatalytic layer of the present embodiment does not comprise the hydrolyzed condensation-polymerization product of titanium alkoxide or the derivative of titanium alkoxide or, even if it comprises some, the content is less than 10 parts by mass relative to the total amount of 100 parts by mass of the photocatalytic particles, the inorganic oxide particles, and the dried substance of titanium alkoxide in terms of titanium dioxide, interstices between the particles can be sufficiently maintained and secured, and thus attain a structure which facilitates diffusion of the harmful gases such as NOx and SOx into the photocatalytic layer. As a result, it is considered that the harmful gases effectively contact with the photocatalytic particles and are decomposed by the photocatalytic activity.

Considering the aforementioned function and effect, as a more preferred constituent in the present embodiment, it is preferable that the sum of the amount of the hydrolyzed condensation-polymerization product of titanium alkoxide or the derivative of titanium alkoxide in terms of titanium dioxide and the amount of the dried substance of the hydrolyzable silicone in terms of silica is 0 part by mass or more and less than 10 parts by mass, preferably 0 part by mass or more and less than 8 parts by mass, more preferably 0 part by mass or more and less than 6 parts by mass. It is the most preferable that the amount of the hydrolyzed condensation-polymerization product of titanium alkoxide or the derivative of titanium alkoxide in terms of titanium dioxide is virtually 0 part by mass.

In addition, making the photocatalytic layer further comprise the hydrolyzed condensation-polymerization product of titanium alkoxide or the derivative of titanium alkoxide as an optional component in an amount of 0 part by mass or more and less than 10 parts by mass, preferably 0 part by mass or more and less than 8 parts by mass, more preferably less than 6 parts by mass in terms of titanium dioxide; more preferably making the sum of the amount of the hydrolyzed condensation-polymerization product of titanium alkoxide or the derivative of titanium alkoxide in terms of titanium dioxide and the amount of the dried substance of the hydrolyzable silicone in terms of silica 0 part by mass or more and less than 10 parts by mass, preferably 0 part by mass or more and less than 8 parts by mass, more preferably 0 part by mass or more and less than 6 parts by mass; and making the amount of the hydrolyzed condensation-polymerization product of titanium alkoxide or the derivative of titanium alkoxide in terms of titanium dioxide virtually 0 part by mass can be suitably combined with each of the constituent elements of the present invention described up to here, and new effects mentioned above may also be exerted without hindering the effects of the constituent elements.

It is preferable that the photocatalytic layer is obtained by heat drying at 200° C. or lower. Accordingly, deterioration of the substrate associated with heating is effectively prevented when the substrate is a resin.

In addition, obtaining the photocatalytic layer by heat drying at 200° C. or lower can be suitably combined with each of the constituent elements of the present invention described up to here, and new effects mentioned above may also be exerted without hindering the effects of the constituent elements.

It is preferable that the hydrolyzable silicone is an organosiloxane having at least one reactive group selected from a group of alkoxy groups, halogen groups, and hydrogen group.

Since these hydrolyzable silicones harden by dehydrative condensation-polymerization by drying at ambient temperature or heat treatment at 10° C. or higher and 500° C. or lower to give a rigid dried substance of the hydrolyzable silicone, the abrasion resistance can be increased.

As the hydrolyzable silicone, a silicone (oligomer and polymer) having a reactive group at its end which is obtained by polymerizing a bifunctional silane, trifunctional silane, or tetrafunctional silane as its monomer unit singly or in combination can be advantageously used. Among these, a silicate obtained by polymerizing a tetrafunctional silane unit ($SiX_4$, X is at least one reactive group selected from a group of alkoxy groups, halogen groups, or hydrogen group) only (hereinafter referred to as tetrafunctional silicone) is the most preferable. Using the tetrafunctional silicone is preferable because the hydrophilicity of the photocatalytic layer is good and self-cleaning property is exerted at the same time. As the tetrafunctional silicone, an alkyl silicate such as methyl silicate, ethyl silicate, and isopropyl silicate can be advantageously used.

In addition, making the hydrolyzable silicone an organosiloxane having at least one reactive group selected from a group of alkoxy groups, halogen groups, and hydrogen group; using the silicone (oligomer and polymer) having a reactive group at its end which is obtained by polymerizing a bifunctional silane, trifunctional silane, or tetrafunctional silane preferably as its monomer unit singly or in combination, as the hydrolyzable silicone; and more preferably using the tetrafunctional silicone can be suitably combined with each of the constituent elements of the present invention described up to here, and new effects mentioned above may also be exerted without hindering the effects of the constituent elements.

It is more preferable that the hydrolyzable silicone is an organosiloxane having an alkoxy group. The organosiloxane having an alkoxy group enables more controllable dehydrative condensation-polymerization reaction compared with the organosiloxane having a halogen or hydrogen group and is likely to give a photocatalytic layer with a stable quality.

In addition, making the hydrolyzable silicone the organosiloxane having an alkoxy group can be suitably combined with each of the constituent elements of the present invention described up to here, and new effects mentioned above may also be exerted without hindering the effects of the constituent elements.

It is more preferable that the dried substance of the hydrolyzable silicone is a hydrolytic condensation-polymerization product of the hydrolyzable silicone.

The hydrolytic condensation-polymerization reaction is more controllable compared with other radical polymerization reaction and the like and is likely to give a photocatalytic layer with a stable quality.

In addition, making the dried substance of the hydrolyzable silicone the hydrolytic condensation-polymerization product of the hydrolyzable silicone can be suitably combined with each of the constituent elements of the present invention described up to here, and new effects mentioned above may also be exerted without hindering the effects of the constituent elements.

The substrate used in the present invention may be various materials, inorganic or organic, as long as the photocatalytic layer can be formed on them and their shape is not limited. Preferred examples from a standpoint of the material include metal, ceramics, glass, plastics, rubber, stone, cement, concrete, fiber, fabrics, wood, paper, a combination thereof, a layered body thereof, and a material having at least one coated layer on their surface.

Any of these substrates can be suitably combined with each of the constituent elements of the present invention described up to here.

The features of the present invention may be exerted more sufficiently if a substrate having at least a surface formed of an organic material is used as the substrate. The substrate having a surface formed of an organic material includes both of a substrate wholly composed of an organic material and a substrate composed of an inorganic material and having a surface coated with an organic material (for example, a coated board). By utilizing the photocatalytic layer of the present invention which is unlikely to erode the organic material vulnerable to the photocatalytic activity, the photocatalyst-coated body having an excellent function can be produced with only one layer of the photocatalytic layer, without interposing an intermediate layer composed of an inorganic material. As a result, since the formation of the intermediate layer composed of the inorganic material is not needed, a time required to produce the photocatalyst-coated body can be reduced, while attaining increase in productivity and reduction in production cost.

In addition, using the substrate having at least a surface formed of an organic material as the substrate can be suitably combined with each of the constituent elements of the present invention described up to here, and new effects mentioned above may also be exerted without hindering the effects of the constituent elements.

An embodiment in which the photocatalytic layer is directly coated on the substrate can also exert the features of the present invention more sufficiently, because the photocatalytic layer of the present invention is excellent in adaptability to the surface irregularity and the like of the substrate, since the photocatalytic layer of the present invention is mainly composed of particles.

In addition, making the photocatalytic layer directly coated on the substrate can be suitably combined with each of the constituent elements of the present invention described up to here, and new effects mentioned above may also be exerted without hindering the effects of the constituent elements.

It is also preferable that an intermediate layer is provided between the substrate and the photocatalytic layer. Especially by utilizing a substance excellent in weather resistance as the intermediate layer, the weather resistance can be increased when the substrate is a resin. As the substance excellent in weather resistance, a silicone-containing resin and a fluorine-containing resin are especially preferable. In addition, utilizing a substance excellent in flexibility as the intermediate layer is preferable because poor appearance due to the cracks and the like is unlikely to occur in use even if the substrate has irregularity. As the substance excellent in flexibility used for the intermediate layer, a resin having a double chain structure, a resin having a cyclic structure, a silicone having a bifunctional monomer unit, and a silicone having both of organic and inorganic crosslinks are especially preferable.

In addition, providing the intermediate layer between the substrate and the photocatalytic layer; using the substance excellent in weather resistance as the intermediate layer; using at least one of the silicone-comprising resin and the fluorine-comprising resin as the substance excellent in weather resistance; using the substance excellent in flexibility as the intermediate layer; and using at least one of the resin having a double chain structure, the resin having a cyclic structure, the silicone having a bifunctional monomer unit, and the silicone having both of organic and inorganic crosslinks as the substance excellent in flexibility can be suitably combined with each of the constituent elements of the present invention described up to here, and new effects mentioned above may also be exerted without hindering the effects of the constituent elements.

The intermediate layer preferably comprises a silicone-modified resin and, more preferably, an acrylic silicone.

In this way, the weather resistance of the intermediate layer, durability against the photocatalytic reaction, flexibility and the like can be sufficiently exerted.

As the silicone-modified resin, a silicone-modified acrylic resin, a silicone-modified epoxy resin, a silicone-modified urethane resin, a silicone-modified polyester, etc. which include polysiloxane in the resin are more preferable from the point of weather resistance.

It is preferable that the silicone-modified resin comprises silicon atom in an amount of 0.2% by mass or more and less than 16.5% by mass, more preferably 6.50% by mass or more and less than 16.50% by mass relative to the solid content of the silicone-modified resin. If the silicon atom content comprised in the silicone-modified resin is 0.2% by mass or more, the weather resistance of the intermediate layer is good and the possibility of erosion by the photocatalyst is suppressed. If the silicon atom content comprised in the silicone-modified resin is less than 16.50% by mass, sufficient flexibility is attained and occurrence of cracks in the intermediate layer is suppressed. The silicon atom content in the aforementioned silicone-modified resin can be measured by the chemical analysis using an X-ray electronic spectroscopic analyzer (XPS).

In addition, it is more preferable that two fluids of the silicone-modified acrylic resin having a carboxyl group and the silicone resin having an epoxy group are mixed and used as the acrylic silicone, from a point of increasing the strength of the coated film.

Although the dry film thickness of the intermediate layer is not particularly limited, it is preferably 1 µm to 50 µm, more preferably 1 µm to 10 µm. If the film thickness is less than 1 µm, the effect to restrict the deterioration of the intermediate layer and the substrate by the photocatalyst may be meager. If the film thickness is more than 50 µm, fine cracks may occur after drying, depending on the type of the intermediate layer.

In addition, making the intermediate layer comprise the silicone-modified resin; making the silicone-modified resin comprise silicon atom in an amount of 0.2% by mass or more and less than 16.5% by mass, more preferably 6.5% by mass or more and less than 16.5% by mass; making the intermediate layer comprise the acrylic silicone; preferably mixing two fluids of the silicone-modified acrylic resin having a carboxyl group and the silicone resin having an epoxy group to be used as the acrylic silicone; and making the dry film thickness of the intermediate layer preferably 1 µm to 50 µm, more preferably 1 µm to 10 µm, can be suitably combined with each of the constituent elements of the present invention described up to here and can exert new effects mentioned above without hindering the effects of the constituent elements.

It is preferable that the intermediate layer comprises an ultraviolet absorption agent. In this way, the weather resistance and the durability against the photocatalytic reaction of the substrate can be further increased.

In addition, making the intermediate layer comprise the ultraviolet absorption agent can be suitably combined with each of the constituent elements of the present invention described up to here and can exert new effects mentioned above without hindering the effects of the constituent elements.

The intermediate layer preferably comprises an organic antifungal agent. By virtue of the organic antifungal agent comprised in the intermediate layer different from the photocatalytic layer as well as the interstices provided between the particles of the photocatalytic layer, the antialgal and antifungal function of the photocatalyst and the antialgal and antifungal function of the organic antifungal agent can be effectively exerted without mutual deterioration.

In addition, making the intermediate layer comprise the organic antifungal agent can be suitably combined with each of the constituent elements of the present invention described up to here and can exert new effects mentioned above without hindering the effects of the constituent elements.

The intermediate layer may further comprise additives for paint such as organic solvent, colored pigment, body pigment, pigment dispersant, antifoaming agent, antioxidant, and the like and other components usually comprised in the paint. In addition, silica microparticles may be comprised as a matting agent.

The aforementioned colored pigment is not particularly limited and, for example, inorganic pigments such as titanium dioxide, iron oxide, carbon black and the like and organic pigments such as phthalocyanine series, benzimidazolone series, isoindolinone series, azo series, anthraquinone series, quinophthalone series, anthrapyridinine series, quinacridone series, toluidine series, pyrathrone series, perylene series, and the like may be used.

Although the coated body of the present invention is applicable to both of exterior and interior materials, it is preferably used for exterior materials because the sunlight can be used as the light source for the photocatalyst. As the exterior material, architectural material, exterior of buildings, window frame, window glass, structural member, exterior and coating of vehicle, exterior of machines and articles, cover and coating for dust prevention, traffic signs, various display apparatus, advertising pillar, sound insulation wall for road, sound insulation wall for railway, bridge, exterior and coating for guard rail, interior and coating for tunnel, insulator, cover for solar cell, heat collection cover for solar water heater, greenhouse, cover for vehicle illuminating lamp, exterior lighting apparatus, rack, and film, sheet, seal, etc. to adhere on the aforementioned articles are exemplified.

In addition, using the coated body as an exterior material can be suitably combined with each of the constituent elements of the present invention described up to here and can exert new effects mentioned above without hindering the effects of the constituent elements.

Furthermore, at least one metal and/or metal compound comprising the metal selected from a group composed of vanadium, iron, cobalt, nickel, manganese, palladium, zinc, ruthenium, rhodium, platinum and gold may be added in the photocatalytic layer. In this way, the catalytic function of these metals may be expressed simultaneously.

Photocatalytic Coating Liquid

The photocatalytic coating liquid according to the present invention is a coating liquid for forming the aforementioned photocatalyst-coated body and comprises a solvent, the photocatalytic particles having an average particle diameter of 10 nm or more and 100 nm or less in an amount of 1 part by mass or more and 5 parts by mass or less, the inorganic oxide particles in an amount of more than 85 parts by mass and 99 parts by mass or less, and the hydrolyzable silicone in an amount of 0 part by mass or more and less than 10 parts by mass in terms of silica, so that the total amount of the photocatalytic particles, the inorganic oxide particles and the hydrolyzable silicone in terms of silica is 100 parts by mass.

That is, when the photocatalytic layer is formed by applying and drying the photocatalytic coating liquid on the substrate, it is considered that considerably lower content of the photocatalytic particles than the inorganic oxide particles (specifically, more than 1 part by mass and less than 5 parts by mass, preferably 2 parts by mass or more and less than 5 parts by mass, more preferably 2 parts by mass or more and 4.5 part by mass or less relative to the total amount of 100 parts by mass of the photocatalytic particles, inorganic oxide particles and hydrolyzable silicone) enables to minimize the direct contact of the photocatalytic particles with the substrate, thereby resulting in low tendency of erosion of the substrate (especially the organic substrate). In addition, it is considered that deterioration of the substrate by ultraviolet light can be reduced by reducing the dose of the ultraviolet light reaching the substrate since the photocatalyst itself absorbs the ultraviolet light.

At the same time, by this construction, it becomes possible to obtain a photocatalyst-coated body excellent in harmful gas decomposability and various desired coating characteristics (such as transparency and film strength), while preventing erosion of the substrate (especially the organic substrate). First of all, the photocatalytic layer is basically composed of two types of particles, i.e., photocatalytic particles and inorganic oxide particles, resulting in the plentiful presence of interstices between the particles. If a large amount of hydrolyzable silicone which is commonly used as a binder of the photocatalytic layer is used, it is considered that the gas diffusion is hindered because such interstices between the particles are densely filled. However, since the photocatalytic layer of the present invention does not comprise the dried substance of the hydrolyzable silicone or, even if it comprises some, the content is less than 10 parts by mass relative to the total amount of 100 parts by mass of the photocatalytic particles, the inorganic oxide particles, and the dried substance of the hydrolyzable silicone in terms of silica, interstices between the particles can be sufficiently maintained and secured and facilitate diffusion of the harmful gases such as NOx and SOx into the photocatalytic layer. As a result, it is considered that the harmful gases effectively contact with the photocatalytic particles and are decomposed by the photocatalytic activity. Considering the aforementioned action and effect, it is the most preferable that the amount of the dried substance of the hydrolyzable silicone in terms of silica is virtually 0 part by mass.

In particular, in the aforementioned construction, the photocatalytic particles can exert photocatalytic decomposition function such as a function to decompose NOx in an amount as small as more than 1 part by mass and less than 5 parts by mass. Therefore, it is considered that a photocatalyst-coated body excellent in weather resistance, hydrophilicity, harmful gas decomposability and various desired coating characteristics (such as transparency and film strength) is realized, while preventing erosion of the substrate (especially the organic substrate). Accordingly, the photocatalytic layer of the present invention can exert excellent durability even with high ultraviolet dose and under hot and humid weather conditions in tropical and subtropical regions especially at low latitudes, at the same time as the photocatalytic decomposition function.

It is preferable that the average particle diameter of the photocatalytic particles in the photocatalytic coating liquid is 10 nm or more and 100 nm or less, more preferably 10 nm or more and 60 nm or less. The average particle diameter is calculated as a number average value of the measured length of arbitrary 100 particles within a visual field of a scanning electron microscope with 200,000× magnification. Although the most preferred shape of the particle is perfect sphere, approximate circle or ellipse may be acceptable, in which case the length of the particle is approximately calculated as ((major axis+minor axis)/2). In this range, gas permeation amount in the photocatalytic layer formed by applying and drying the photocatalytic coating liquid on the substrate, specific surface area for sufficient gas decomposition activity, monocrystalline size for sufficient photocatalytic activity of the particle, and various coating film characteristics such as transparency and weather resistance can be exerted in a balanced manner. Furthermore, making the average particle diameter of the photocatalytic particles 10 nm or more and 100 nm or less, more preferably 10 nm or more and 60 nm or less can be suitably combined with each of the constituent elements of the present invention described up to here, and new effects mentioned above may also be exerted without hindering the effects of the constituent elements.

As the photocatalytic particles, particles of metal oxide such as titanium oxide ($TiO_2$), ZnO, $SnO_2$, $SrTiO_3$, $WO_3$, $Bi_2O_3$, and $Fe_2O_3$ are exemplified. Any metal oxides exemplified here can be suitably combined with each constituent elements of the present invention described up to here.

As the photocatalytic particles in the photocatalytic coating liquid, titanium oxide particles are preferable. Titanium oxide has better water resistance compared with ZnO and exerts better photocatalytic function compared with $SnO_2$ such as gas decomposition by the light of the wavelength of 380 nm to 420 nm which is included sufficiently in sunlight. Furthermore, microparticles of a nanometer order of titanium oxide are more available than $SrTiO_3$, therefore the specific surface area is large and practically sufficient photocatalytic activity is attainable. Furthermore, due to its larger bandgap compared with $WO_3$, $Bi_2O_3$, and $Fe_2O_3$, titanium oxide has a sufficient oxidation power, prevents recoupling of conductive electron and positive hole after photoexcitation, and has activation energy sufficient for gas decomposition. In addition, titanium oxide is harmless, chemically stable, and available at low cost. In addition, due to its high bandgap energy, titanium oxide needs ultraviolet light for photoexcitation and does not absorb visible light in the process of photoexcitation, resulting in no coloration by complementary color component.

Titanium oxide is available in various forms such as powder, sol, solution, etc., and titanium oxide in any form may be added into the coating liquid as long as it shows photocatalytic activity after applying and drying on the substrate.

Using titanium oxide particles as the photocatalytic particles can be suitably combined with each of the constituent elements of the present invention described up to here, and new effects mentioned above may also be exerted without hindering the effects of the constituent elements.

As the photocatalytic particles in the photocatalytic coating liquid, anatase-type titanium oxide is preferable among titanium oxide particles. Anatase-type titanium oxide has an oxidation power stronger than rutile-type titanium oxide and exerts stronger photocatalytic function such as gas decomposition. Furthermore, using anatase-type titanium oxide particles as the photocatalytic particles can be suitably combined with each of the constituent elements of the present invention described up to here, and new effects mentioned above may also be exerted without hindering the effects of the constituent elements.

It is preferable that Cu component is further incorporated into the photocatalytic coating liquid. Cu itself has excellent antifungal characteristics and excellent adsorption characteristics for harmful gases and acts on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide.

Incorporating Cu component into the photocatalytic coating liquid can be suitably combined with each of the constituent elements of the present invention described up to here, and new effects mentioned above may also be exerted without hindering the effects of the constituent elements.

It is preferable that Cu component is supported on the photocatalytic particles in the photocatalytic coating liquid. Not only simply incorporating the Cu component but also making the Cu component positively supported on the photocatalytic particles can act on the photocatalytic particles to decrease the probability of recoupling of conductive electron and positive hole generated by photoexcitation of the photocatalyst and thus increase the oxidation power of the photocatalytic particles, further facilitating the effect of increasing gas decomposition power. Larger effect is exerted if the photocatalyst is a photocatalyst having intrinsically strong oxidation power, such as titanium oxide, especially anatase-type titanium oxide. Furthermore, making Cu positively supported on the photocatalytic particles can be suitably combined with each of the constituent elements of the present invention described up to here, and new effects mentioned above may also be exerted without hindering the effects of the constituent elements.

It is preferable that both of the Cu component and the Ag component are both incorporated into the photocatalytic coating liquid. Incorporating both of Cu and Ag into the photocatalytic coating liquid not only exerts the excellent antifungal characteristics of Cu and excellent antibacterial characteristics of Ag simultaneously, but substantially increases the decomposition activity of the photocatalyst. Although the mechanism is not clear at present, mutual interactions among the photocatalytic particles, Ag, and Cu are presumably correlated. Larger effect is exerted if the photocatalyst is a photocatalyst having intrinsically strong oxidation power, such as titanium oxide, especially anatase-type titanium oxide. Furthermore, incorporating both of the Cu component and the Ag component into the photocatalytic coating liquid can be suitably combined with each of the constituent elements of the present invention described up to here, and new effects mentioned above may also be exerted without hindering the effects of the constituent elements.

It is preferable that both of the Cu component and the Ag component are supported on the photocatalytic particles in the photocatalytic coating liquid. Not only making Cu and Ag present in the photocatalytic coating liquid but also making Cu and Ag positively supported on the photocatalytic particles can act on the photocatalytic particles to decrease the probability of recoupling of conductive electron and positive hole generated by photoexcitation of the photocatalyst and thus increase the oxidation power of the photocatalytic particles, further facilitating the effect of increasing gas decomposition power. Larger effect is exerted if the photocatalyst is a photocatalyst having intrinsically strong oxidation power, such as titanium oxide, especially anatase-type titanium oxide. Furthermore, making both of Cu and Ag positively supported on the photocatalytic particles can be further suitably combined with each of the constituent elements of the present invention described up to here, and new effects mentioned above may also be exerted without hindering the effects of the constituent elements.

As the inorganic oxide particles in the photocatalytic coating liquid, for example, particles of single oxide such as silica, alumina, zirconia, ceria, yttria, boronia, magnesia, calcia, ferrite, iron oxide, amorphous titania, hafnia, tin oxide, manganese oxide, niobium oxide, nickel oxide, cobalt oxide, indium oxide, lanthanum oxide, barium oxide, etc.; or complex oxide such as aluminosilicate, barium titanate, calcium silicate, etc. can be suitably used. These inorganic oxide particles are preferably added in the form of an aqueous colloid in water as a dispersant or an organosol dispersed in a form of colloid in a hydrophilic solvent such as ethyl alcohol, isopropyl alcohol, or ethylene glycol and the like.

It is considered that mixing the inorganic oxide particles in the photocatalytic coating liquid can moderately decrease the amount of the photocatalyst and minimize the direct contact of the photocatalytic particles with the substrate, while securing the gas permeability in the photocatalytic layer obtained by applying and drying the photocatalytic coating liquid, thereby preventing the erosion of the substrate (especially the organic substrate). In addition, it is considered that deterioration of the substrate by ultraviolet light can be reduced by reducing the dose of the ultraviolet light reaching the substrate since the photocatalyst itself absorbs the ultraviolet light.

As the inorganic oxide particles in the photocatalytic coating liquid, silica is the most preferable. Incorporating silica increases the hydrophilicity of the photocatalytic layer, which is washed by water or rainwater, resulting in effectively preventing the stain adhered to the surface from decreasing the decomposition function of the photocatalyst. This preventive effect is especially enhanced if the photocatalyst is a photocatalyst having intrinsically strong oxidation power, such as titanium oxide, especially anatase-type titanium oxide. The silica particles are preferably in the form of an aqueous colloid in water as a dispersant or an organosol dispersed in a form of colloid in a hydrophilic solvent such as ethyl alcohol, isopropyl alcohol, or ethylene glycol and the like, especially preferably being colloidal silica. Furthermore, using silica particles as the inorganic oxide particles can be suitably combined with each of the constituent elements of the present invention described up to here, and new effects mentioned above may also be exerted without hindering the effects of the constituent elements.

As for the inorganic oxide particles in the photocatalytic coating liquid, the number average particle diameter calculated by the measurement of the length of arbitrary 100 particles within a visual field of a scanning electron microscope with 200,000× magnification is preferably 5 nm or more and less than 40 nm, more preferably more than 5 nm and 20 nm or less.

Using the inorganic oxide particles with the average particle diameter of less than 40 nm, more preferably 20 nm or less, improves the gas permeability, the gas decomposition reactivity and the abrasion resistance in the photocatalytic layer obtained by applying and drying the photocatalytic coating liquid on the substrate Furthermore, making the inorganic oxide particles in the photocatalytic coating liquid have a number average particle diameter of 5 nm or more and less than 40 nm, more preferably more than 5 nm and 20 nm or less, can be suitably combined with each of the constituent elements of the present invention described up to here, and new effects mentioned above may also be exerted without hindering the effects of the constituent elements.

The photocatalytic coating liquid may comprise a surfactant as an optional component. The surfactant used in the present invention may be comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles, and the hydrolyzable silicone. One of the effects of the surfactant is leveling property to the substrate. In the case where the leveling effect is necessary, such as coating in a large area, amount of the surfactant may be determined in the aforementioned range as needed depending on the combination of the coating liquid and the substrate. The lower limit in this case is preferably 0.1 part by mass relative to the total amount of 100 parts by mass of the photocatalytic particles, the inorganic oxide particles, and the hydrolyzable silicone. Although the surfactant is an effective component to improve the wettability of the photocatalytic coating liquid, it is equivalent to the inevitable impurity which no longer contributes to the effect of the photocatalyst-coated body of the present invention in the photocatalytic layer formed after applying and drying. Therefore, the upper limit should be less than 10 parts by mass, preferably less than 8 parts by mass, more preferably 6 parts by mass or less, relative to the total amount of 100 parts of the photocatalytic particles, inorganic oxide particles, and the hydrolyzable silicone. That is, the surfactant may be used in the aforementioned range of the content depending on the wettability required for the photocatalytic coating liquid. It is most preferable that the surfactant is virtually or definitely not comprised for the application where the wettability is not required. The surfactant to be used may be selected from nonionic surfactant, anionic surfactant, cationic surfactant, and amphoteric surfactant as needed considering the dispersion stability of the photocatalyst and the inorganic oxide particles and the wettability when applied on the intermediate layer. Among these a nonionic surfactant is especially preferable, among which more preferable are ether-type nonionic surfactant, ester-type nonionic surfactant, polyalkylene glycol-type nonionic surfactant, fluorine-type nonionic surfactant, and silicone-based nonionic surfactant.

Furthermore, as for the surfactant used in the coating liquid of the present invention, making the surfactant comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles, and the hydrolyzable silicone can be suitably combined with each of the constituent elements of the present invention described up to here, and new effects mentioned above may also be exerted without hindering the effects of the constituent elements.

The photocatalytic coating liquid may further comprise a hydrolyzed condensation-polymerization product of titanium alkoxide or a derivative of titanium alkoxide as an optional component in an amount of 0 part by mass or more and less than 10 parts by mass, preferably 0 part by mass or more and less than 8 parts by mass, more preferably less than 6 parts by mass, in terms of titanium dioxide.

If the photocatalytic coating liquid comprises the hydrolyzed condensation-polymerization product of titanium alkoxide or the derivative of titanium alkoxide in an amount as small as less than 10 parts by mass, preferably less than 8 parts by mass, more preferably less than 6 parts by mass, in terms of titanium dioxide, abrasion resistance slightly increases and curing of the photocatalytic layer may be expected in shorter time after coating compared with the hydrolyzable silicone. However, it is preferable that the interstices between the particles of the photocatalytic layer are sufficiently maintained in order to take advantage of the photocatalytic gas decomposition characteristics of the present invention such as the excellent ability to decompose NOx. If the hydrolyzed condensation-polymerization product of titanium alkoxide or the derivative of titanium alkoxide is used in an amount as large as 10 parts by mass or more in terms of titanium dioxide, it is considered that such interstices between the particles are densely filled to prevent the diffusion of gases, similarly to the case where a hydrolyzable silicone commonly used as a binder for the photocatalytic layer is used in a large amount. On the other hand, since the photocatalytic coating liquid of the present embodiment does not comprise the hydrolyzed condensation-polymerization product of titanium alkoxide or the derivative of titanium alkoxide or, even if it comprises some, the amount is less than 10 parts by mass relative to the total amount of 100 parts by mass of the photocatalytic particles, the inorganic oxide particles, and the dried substance of titanium alkoxide in terms of titanium dioxide, it is considered to be possible to maintain and secure interstices between the particles, which attain a structure where the harmful gases such as NOx and SOx are easily diffused into the photocatalytic layer. As a result, it is considered that the harmful gases effectively contact with the photocatalytic particles and are decomposed by the photocatalytic activity.

Considering the aforementioned action and effect, as a more preferred construction in the present embodiment, it is preferable that the sum of the amount of the hydrolyzed condensation-polymerization product of titanium alkoxide or the derivative of titanium alkoxide in terms of titanium dioxide and the amount of the dried substance of the hydrolyzable silicone in terms of silica is 0 part by mass or more and less than 10 parts by mass, preferably 0 part by mass or more and less than 8 parts by mass, more preferably 0 part by mass or more and less than 6 parts by mass. It is the most preferable that the amount of the hydrolyzed condensation-polymerization product of titanium alkoxide or the derivative of titanium alkoxide in terms of titanium dioxide is virtually 0 part by mass.

In addition, making the photocatalytic coating liquid further comprise the hydrolyzed condensation-polymerization product of titanium alkoxide or the derivative of titanium alkoxide as an optional component in an amount of 0 part by mass or more and less than 10 parts by mass, preferably 0 part by mass or more and less than 8 parts by mass, more preferably less than 6 parts by mass in terms of titanium dioxide; making the sum of the amount of the hydrolyzed condensation-polymerization product of titanium alkoxide or the derivative of titanium alkoxide in terms of titanium dioxide and the amount of the dried substance of the hydrolyzable silicone in terms of silica 0 part by mass or more and less than 10 parts by mass, preferably 0 part by mass or more and less than 8 parts by mass, more preferably 0 part by mass or more and less than 6 parts by mass; and making the amount of the hydrolyzed condensation-polymerization product of titanium alkoxide or the derivative of titanium alkoxide in terms of titanium dioxide virtually 0 part by mass can be suitably combined with each of the constituent elements of the present invention described up to here, and new effects mentioned above may also be exerted without hindering the effects of the constituent elements.

It is preferable that the hydrolyzable silicone, which is an optional component in the photocatalytic coating liquid, is an organosiloxane having at least one reactive group selected from the group consisting of alkoxy group, halogen group, and hydrogen group.

Since these hydrolyzable silicones, after applying to the substrate, harden by dehydrative condensation-polymerization by drying at ambient temperature or heat treatment at 10° C. or higher and 500° C. or lower to give a rigid dried substance of the hydrolyzable silicone, so that the abrasion resistance can be increased.

As the hydrolyzable silicone, a silicone having a reactive group at its end which is obtained by polymerizing a bifunctional silane, trifunctional silane, or tetrafunctional silane as its monomer unit singly or in combination (oligomer and polymer) can be advantageously used. Among these, a silicate obtained by polymerizing a tetrafunctional silane unit ($SiX_4$, X is at least one reactive group selected from the group consisting of alkoxy group, halogen group, or hydrogen group) only (hereinafter referred to as tetrafunctional silicone) is the most preferable. Using the tetrafunctional silicone is preferable because the hydrophilicity of the photocatalytic layer is good and self-cleaning property is exerted at the same time. As the tetrafunctional silicone, an alkyl silicate such as methyl silicate, ethyl silicate, and isopropyl silicate can be advantageously used.

In addition, making the hydrolyzable silicone, which is an optional component in the photocatalytic coating liquid, an organosiloxane having at least one reactive group selected from the group consisting of alkoxy group, halogen group, and hydrogen group; using the silicone (oligomer and polymer) having a reactive group at its end which is preferably obtained by polymerizing a bifunctional silane, trifunctional silane, or tetrafunctional silane as its monomer unit singly or in combination as the hydrolyzable silicone; and more preferably using the tetrafunctional silicone can be suitably combined with each of the constituent elements of the present invention described up to here, and new effects mentioned above may also be exerted without hindering the effects of the constituent elements.

It is more preferable that the hydrolyzable silicone, which is an optional component in the photocatalytic coating liquid, is an organosiloxane having an alkoxy group. The organosiloxane having an alkoxy group makes it easier to control dehydrative condensation-polymerization reaction, compared with the organosiloxane having a halogen or hydrogen group, and to form a photocatalytic layer with a stable quality.

In addition, making the hydrolyzable silicone, which is an optional component in the photocatalytic coating liquid, the organosiloxane having an alkoxy group can be suitably combined with each of the constituent elements of the present invention described up to here, and new effects mentioned above may also be exerted without hindering the effects of the constituent elements.

Furthermore, at least one metal selected from a group consisting of vanadium, iron, cobalt, nickel, manganese, palladium, zinc, ruthenium, rhodium, platinum and gold and/or a metal compound the metal may be added into the photocatalytic coating liquid. In this way, the catalytic functions of these metals may be exerted simultaneously. The addition can be performed by any method such as mixing and dissolving or dispersing the metal or metal compound to the coating liquid, or making the metal or metal compound supported on the photocatalytic layer or photocatalytic particles.

As a solvent in the photocatalytic coating liquid, both of water and organic solvent may be used, water being preferable. In this way, the coating film can be formed without volatilization of the organic solvent at coating, which is preferable from the standpoint of environment. In addition, although the solid concentration of the photocatalytic coating liquid of the present invention is not particularly limited, 1 to 10% by mass is preferable because of easiness of coating. In addition, the constituent of the photocatalytic coating composition can be analyzed by separating the coating liquid into the particle component and the filtrate by ultrafiltration, followed by individual analysis by infrared spectroscopic analysis, gel permeation chromatography, fluorescent X-ray spectroscopy, etc. and analysis of the spectrum.

In addition, using water as the solvent for the photocatalytic coating liquid; and making the solid concentration of the photocatalytic coating liquid 1 to 10% by mass can be suitably combined with each of the constituent elements of the present invention described up to here and can exert new effects mentioned above without hindering the effects of the constituent elements.

Among the aforementioned photocatalyst-coated bodies, the coating liquid for forming the intermediate layer to form the photocatalyst-coated body provided with the intermediate layer preferably comprises a solvent and a silicone-modified resin, more preferably a solvent and an acrylic silicone.

In this way, the weather resistance, durability against the photocatalytic reaction, flexibility and the like of the intermediate layer can be sufficiently exerted.

As the silicone-modified resin, a silicone-modified acrylic resin, a silicone-modified epoxy resin, a silicone-modified urethane resin, a silicone-modified polyester, etc. which include polysiloxane in the resin are more preferable from the point of weather resistance.

It is preferable that the silicone-modified resin comprises silicon atom in an amount of 0.2% by mass or more and less than 16.5% by mass, more preferably 6.5% by mass or more and less than 16.5% by mass relative to the solid content of the silicone-modified resin. If the silicon atom content comprised in the silicone-modified resin is 0.2% by mass or more, the weather resistance of the intermediate layer is good and the possibility of erosion by the photocatalyst is suppressed. If the silicon atom content comprised in the silicone-modified resin is less than 16.5% by mass, sufficient flexibility is attained and occurrence of cracks in the intermediate layer is suppressed. The silicon atom content in the aforementioned silicone-modified resin can be measured by the chemical analysis using an X-ray photoelectron spectroscopic analyzer (XPS).

In addition, it is more preferable that two fluids of the silicone-modified acrylic resin having a carboxyl group and the silicone resin having an epoxy group are mixed and used as the acrylic silicone, from a point of increasing the strength of the coated film.

In addition, making the intermediate layer comprise the silicone-modified resin; making the silicone-modified resin comprise silicon atom in an amount of 0.2% by mass or more and less than 16.5% by mass, more preferably 6.5% by mass or more and less than 16.5% by mass; making the intermediate layer comprise the acrylic silicone; and mixing and using two fluids of the silicone-modified acrylic resin having a carboxyl group and the silicone resin having an epoxy group as the acrylic silicone can be suitably combined with each of the constituent elements of the present invention described up to here and can exert new effects mentioned above without hindering the effects of the constituent elements.

In addition, making the coating liquid for forming the intermediate layer comprise the solvent and the silicone-modified resin; and making the coating liquid for forming the intermediate layer comprise the solvent and the acrylic silicone can be suitably combined with each of the constituent elements of the present invention described up to here and can exert new effects mentioned above without hindering the effects of the constituent elements.

Among the aforementioned photocatalyst-coated bodies, the coating liquid for forming the intermediate layer to form the photocatalyst-coated body provided with the intermediate layer preferably comprises an ultraviolet absorption agent. In this way, the weather resistance and the durability against the photocatalytic reaction of the substrate can be further increased.

In addition, making the coating liquid for forming the intermediate layer comprise the ultraviolet absorption agent can be suitably combined with each of the constituent elements of the present invention described up to here and can exert new effects mentioned above without hindering the effects of the constituent elements.

Among the aforementioned photocatalyst-coated bodies, the coating liquid for forming the intermediate layer to form the photocatalyst-coated body provided with the intermediate layer preferably comprises an organic antifungal agent. In virtue of the organic antifungal agent comprised in the intermediate layer different from the photocatalytic layer as well as the interstices provided between the particles of the photocatalytic layer, the antialgal and antifungal function of the photocatalyst and the antialgal and antifungal function of the organic antifungal agent can be effectively exerted without mutual deterioration.

In addition, making the coating liquid for forming the intermediate layer comprise the antifungal agent can be suitably combined with each of the constituent elements of the present invention described up to here and can exert new effects mentioned above without hindering the effects of the constituent elements.

As a solvent in the coating liquid for forming the intermediate layer, both of water and organic solvent may be used, water being preferable. In this way, the coating film can be formed without volatilization of the organic solvent at coating, which is preferable from the standpoint of environment.

In addition, although the solid concentration of the liquid agent for coating the intermediate layer of the present invention is not particularly limited, 10 to 20% by mass is preferable because of easiness of coating. In addition, the constituent of the coating liquid for the intermediate layer can be analyzed by infrared spectroscopic analysis regarding the resin components.

In addition, using water as the solvent for the coating liquid for forming the intermediate layer; and making the solid concentration of the liquid agent for coating the intermediate layer of the present invention preferably 10 to 20% by mass can be suitably combined with each of the constituent elements of the present invention described up to here and can exert new effects mentioned above without hindering the effects of the constituent elements.

Method for Producing the Photocatalytic Layer

The photocatalyst-coated body of the present invention can be easily produced by applying the photocatalytic coating liquid of the present invention on the substrate. As the application method of the photocatalytic layer, commonly and widely performed methods such as brushing, roller coating, spraying, a roll coater, a flow coater, dip coating, flow coating, screen printing, etc. can be used. After applying the coating liquid on the substrate, it may be dried at ambient temperature or by heating as needed. If the coated body is heated until sintering is advanced, the interstices between the particles are decreased, resulting in insufficient photocatalytic activity. In the present invention, the drying temperature is 10° C. or higher and 500° C. or lower. The upper limit may be determined as needed depending on the type of the substrate. If a resin is comprised in at least a part of the substrate, the preferred drying temperature is 10° C. or higher and 200° C. or lower, considering the allowable temperature limit of the resin, etc.

Method for Producing the Intermediate Layer

The intermediate layer coated body of the present invention can be easily produced by applying the intermediate layer coating liquid of the present invention on the substrate. As the application method of the intermediate layer, commonly and widely performed methods such as brushing, roller coating, spraying, a roll coater, a flow coater, dip coating, flow coating, screen printing, electrocoating, vapor deposition, etc. can be used. After applying the coating liquid on the substrate, it may be dried at ambient temperature or by heating as needed.

EXAMPLES

Example A

The present invention is specifically illustrated based on the following examples. The present invention is not limited to these examples.

The raw materials used for the preparation of the photocatalytic coating liquid in the following examples are as follows:

Photocatalytic Particles
  Titania water dispersion (Average particle diameter: 42 nm, basic)
Inorganic Oxide Particles
  Water dispersed colloidal silica (Average particle diameter: 14 nm, basic) (Used in Examples 1 to 7, Example 9, and Examples 11 to 23)
  Water dispersed colloidal silica (Average particle diameter: 26 nm, basic) (Used in Example 8)
  Water dispersed colloidal silica (Average particle diameter: 5 nm, basic) (Used in Example 10)
Hydrolyzable Silicone
  Polycondensation product of tetramethoxysilane (Concentration as converted to $SiO_2$: 51% by mass, Solvent: methanol and water)
Surfactant
  Polyether modified silicone type surfactant Examples 1 to 3

Evaluation of Weather Resistance (Outdoor Exposure)

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a sealer-treated siding substrate for ceramics industry, followed by sufficient drying and curing. Meanwhile, the titania water dispersion as the photocatalyst, the water dispersed colloidal silica as the inorganic oxide, water as the solvent, and the surfactant were mixed in the compounding ratio shown in Table 1 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 µm for any of Examples 1 to 3.

The photocatalyst-coated body of the size of 50×100 mm thus obtained was subjected to outdoor exposure at the elevation angle of 20° and facing south using an exposure rack defined in JIS K 5600-7-6 in Miyakojima Island. The external appearance was confirmed by visual observation every three months.

The results obtained are shown in Table 1. "G" in the Table represents little change and "NG" represents occurrence of slight efflorescence. As shown in Table 1, it was found that sufficient weather resistance can be attained by making the photocatalytic layer comprise less than 5 parts by mass of the photocatalytic particles, even if the organic substrate is painted with the photocatalytic layer in Miyakojima Island.

TABLE 1

| | Titanium oxide particles (parts by mass) | Silica particles (parts by mass) | Surface-active agent (parts by mass) | Appearance change | | |
|---|---|---|---|---|---|---|
| | | | | 3 months | 6 months | 12 months |
| Example 1 | 4.5 | 95.5 | 6 | G | G | G |
| Example 2 | 10 | 90 | 6 | G | NG | NG |
| Example 3 | 20 | 80 | 6 | NG | NG | NG |

Examples 4 to 6

Evaluation of Hydrophilicity after Ultraviolet Exposure

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide having various average particle diameters shown in Table 2, water as the solvent, and the surfactant were mixed in the compounding ratio shown in Table 2 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 µm for any of Examples 4 to 6.

The hydrophilicity was evaluated for the photocatalyst-coated body thus obtained as follows. The photocatalyst-coated body was cured in a dark place for 1 day and allowed to stand under the BLB light adjusted at 1 mW/cm$^2$ with the photocatalyst painted surface upward for 7 days. The contact angle of the photocatalyst painted surface was measured by a contact angle meter (CA-X150 Type manufactured by Kyowa Interface Science Co., Ltd.). The measurement of the contact angle was to substitute hydrophilicity.

The results obtained are shown in Table 2. The evaluation criteria of the hydrophilicity after ultraviolet exposure are as follows.

[Hydrophilicity]
A: Contact angle less than 10°
B: Contact angle 10° or more and less than 20°
C: Contact angle 20° or more As shown in Table 2, it was found that the high hydrophilicity was secured by using the photocatalytic layer comprising 2 parts by mass or more of the photocatalytic particles.

TABLE 2

| | Titanium oxide particles (parts by mass) | Silica particles (parts by mass) | Surface-active agent (parts by mass) | Hydrophilicity |
|---|---|---|---|---|
| Example 4 | 2 | 98 | 6 | B |
| Example 5 | 4.5 | 95.5 | 6 | A |
| Example 6 | 1 | 99 | 6 | C |

Examples 7 and 8

Evaluation of Sliding Abrasion Resistance

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a slate board treated with an epoxy resin for sealing, followed by sufficient drying and curing. Meanwhile, the titania water dispersion as the photocatalyst, the water dispersed colloidal silica as the inorganic oxide having various average particle diameters shown in Table 3, water as the solvent, and the surfactant were mixed in the compounding ratio shown in Table 3 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 µm for any of Examples 7 to 8.

The washing resistance test for the photocatalyst-coated body thus obtained was performed as follows. The test method was according to JIS A6909. The photocatalyst-coated body was horizontally fixed on a test rack of a washability apparatus (Washability Tester No. 458 manufactured by Toyo Seiki Seisaku-sho, Ltd.) with the photocatalyst painted surface facing upward. A pig bristle brush of a dry weight of 450 g was put on the photocatalyst painted surface after the bristles were immersed in an aqueous soap solution of 0.5% and reciprocated 500 times. Then the photocatalyst-coated body was removed, washed with water and dried.

After irradiating the thoroughly dried photocatalyst-coated body with BLB light adjusted at 3 mW/cm$^2$ for 24 hours, the contact angle of the photocatalyst-painted surface was measured by a contact angle meter (CA-X150 Type manufactured by Kyowa Interface Science Co., Ltd.). The measurement of the contact angle was to substitute hydrophilicity.

The results obtained are shown in Table 3. The evaluation criteria of the sliding abrasion resistance are as follows.

[Sliding Abrasion Resistance]

A: Contact angle less than 10°

B: Contact angle 10° or more

As shown in Table 3, it was found that the photocatalyst-coated body of Example 7 formed a strong film against sliding.

TABLE 3

| | Titanium oxide particle (parts by mass) | Silica particle (parts by mass) | Silica particle average particle diameter (nm) | Surface-active agent (parts by mass) | Sliding abrasion resistance |
|---|---|---|---|---|---|
| Example 7 | 4.5 | 95.5 | 14 | 6 | A |
| Example 8 | 4.5 | 95.5 | 26 | 6 | B |

Examples 9 and 10

Measurement of Haze

The photocatalyst-coated body comprising the photocatalytic layer was produced as follows. First, a float plate glass having transmittance of 94% at the wavelength of 550 nm was used as the substrate. Meanwhile, the titania water dispersion as the photocatalyst, the water dispersed colloidal silica as the inorganic oxide having various average particle diameters shown in Table 4, water as the solvent, and the surfactant were mixed in the compounding ratio shown in Table 4 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned substrate was spin coated by the photocatalytic coating liquid obtained at 1000 rpm for 10 seconds, followed by drying at 120° C. to obtain the photocatalytic layer. Haze of the photocatalyst-coated body of the size of 50×100 mm thus obtained was measured using a haze meter (Haze-Gard Plus manufactured by Paul N. Gardner Company, Inc.).

The results obtained are shown in Table 4. It was found that the photocatalyst-coated body of Example 9 suppressed the haze to less than 1% and the transparency was secured.

TABLE 4

| | Titanium oxide particle (parts by mass) | Silica particle (parts by mass) | Silica particle average particle diameter (nm) | Surface-active agent (parts by mass) | Haze (%) |
|---|---|---|---|---|---|
| Example 9 | 4.5 | 95.5 | 14 | 6 | 0.62 |
| Example 10 | 4.5 | 95.5 | 5 | 6 | 1.25 |

Examples 11 to 14

Evaluation of Harmful Gas Decomposition Activity

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide, the water dispersed colloidal silica as the inorganic oxide having various average particle diameters shown in Table 5, water as the solvent, and the surfactant were mixed in the compounding ratio shown in Table 5 to obtain the photocatalytic coating liquid. Therefore, the photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation is shown in Table 5.

The gas decomposition activity test of thus obtained photocatalyst-coated body of size the 50×100 mm was performed as follows. The photocatalyst-coated body was irradiated with BLB light of 1 mW/cm$^2$ for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm$^2$ with the introduced gas present. Then the reaction vessel was light shielded again with the introduced gas present. The NOx removal was calculated from the concentrations of NO and NO$_2$ before and after BLB light irradiation according to the following equation.

$$NOx\ Removal = [NO(\text{after irradiation}) - NO(\text{at irradiation})] - [NO_2(\text{at irradiation}) - NO_2(\text{after irradiation})]$$

The results obtained are shown in Table 5. As shown in Table 5, it was found that the sufficient NOx decomposition activity was attained even if the content of the photocatalytic particles in the photocatalytic layer was less than 5 parts by mass.

TABLE 5

|  | Titanium oxide particle (parts by mass) | Silica particle (parts by mass) | Surface-active agent (parts by mass) | Film thickness (μm) | NOx removal (Example 14 = 100) |
|---|---|---|---|---|---|
| Example 11 | 4.5 | 95.5 | 6 | 0.5 | 53 |
| Example 12 | 4.5 | 95.5 | 6 | 1 | 98 |
| Example 13 | 2 | 98 | 6 | 1.5 | 57 |
| Example 14 | 10 | 90 | 6 | 1 | 100 |

Examples 15 to 17

Influence of Hydrolyzable Silicone

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide, water as the solvent, a polycondensation product of tetramethoxysilane as the hydrolyzable silicone, and the surfactant were mixed in the compounding ratio shown in Table 6 to obtain the photocatalytic coating liquid. The photocatalytic coating liquid of Example 15 does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 15 to 17.

The gas decomposition activity of thus obtained photocatalyst-coated body of size the 50×100 mm was performed as follows. The photocatalyst-coated body was irradiated with BLB light of 1 mW/cm$^2$ for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm$^2$ with the introduced gas present. Then the reaction vessel was light shielded again with the introduced gas present. The NOx removal was calculated from the concentrations of NO and NO$_2$ before and after BLB light irradiation according to the following equation.

NOx Removal=[NO(after irradiation)−NO(at irradiation)]−[NO$_2$(at irradiation)−NO$_2$(after irradiation)]

The results obtained are shown in Table 6. NOx removal in Example 15, in which the hydrolyzable silicone was not comprised at all, is taken as 100. Other examples of 50 or more and less than 50, relative to Example 15, are expressed as G and NG, respectively. As shown in Table 6, the photocatalytic layer composed of the photocatalytic particles and the inorganic oxides and comprising essentially no hydrolyzable silicone exhibited an excellent NOx decomposition activity. On the other hand, it was found that the sample comprising 10 parts by mass of the hydrolyzable silicone lost the NOx decomposition activity.

TABLE 6

|  | Titanium oxide particles (parts by mass) | Silica particles (parts by mass) | Hydrolyzable silicone (parts by mass) | Surface-active agent (parts by mass) | NOx removal (Example 15 = 100) |
|---|---|---|---|---|---|
| Example 15 | 4.5 | 95.5 | 0 | 6 | G (100) |
| Example 16 | 4.5 | 90.5 | 5 | 6 | G (84) |
| Example 17 | 4.5 | 85.5 | 10 | 6 | NG (41) |

Examples 18 and 19

Weather Resistance Test (Evaluation of Substrate Deterioration)

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide, water as the solvent, and the surfactant were mixed in the compounding ratio shown in Table 7 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 18 and 19.

The weather resistance test for the photocatalyst-coated body of the size of 50×100 mm thus obtained was performed as follows. The photocatalyst-coated body was put into a xenon arc weather resistance testing apparatus combined with hydrogen peroxide spray (Ci4000 manufactured by Toyo Seiki Seisaku-sho Ltd.). Intensity of the xenon arc was 80 W/m$^2$ (wavelength 300 to 400 nm). Concentration of hydrogen peroxide was 1%. Irradiation with the xenon lamp was performed at 22 hours per cycle. Spraying of hydrogen peroxide was performed repeatedly in a cycle of 3 minutes spraying and 2 minutes stopping during the initial 2 hours. After 200 hours the sample was taken out and a cellophane tape was adhered on the painted surface followed by peeling off at once. The weather resistance was evaluated by the presence or absence of the powder of the colored organic coating adhered to the glue surface of the tape due to the deterioration of the coated film (chalking phenomenon).

The results obtained are shown in Table 7. "G" in the Table represents that very little powder adhered to the glue surface of the tape. As shown in Table 7, it was found that the photocatalyst-coated body comprising less than 5 parts by mass of the photocatalytic particles in the photocatalytic layer has a sufficient weather resistance.

TABLE 7

| | Titanium oxide particle (parts by mass) | Silica particle (parts by mass) | Surface-active agent (parts by mass) | Presence or absence of deterioration of the coated film |
|---|---|---|---|---|
| Example 18 | 2 | 98 | 6 | G |
| Example 19 | 4.5 | 95.5 | 6 | G |

Examples 20 to 23

Measurement of Linear Transmittance

The photocatalyst-coated body comprising the photocatalytic layer was produced as follows. First, a float plate glass having transmittance of 94% at the wavelength of 550 nm was prepared as the substrate. Meanwhile, the titania water dispersion as the photocatalyst, the water dispersed colloidal silica as the inorganic oxide, water as the solvent, and the surfactant were mixed in the compounding ratio shown in Table 8 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned float plate glass which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation is shown in Table 8.

The measurement of linear (550 nm) transmittance for the photocatalyst-coated body of the size of 50×100 mm thus obtained was performed using an ultraviolet-visible-near infrared spectrophotometer (UV-3150 manufactured by Shimadzu Corporation).

The results obtained are shown in Table 8. The evaluation criteria of the linear transmittance are as follows.

[Linear Transmittance]
A: Linear (550 nm) transmittance 95% or more
B: Linear (550 nm) transmittance 90% or more and less than 95%

The photocatalyst-coated bodies in Table 8 showed high transparency.

TABLE 8

| | Titanium oxide particle (parts by mass) | Silica particle (parts by mass) | Surface-active agent (parts by mass) | Film thickness (micro-meter) | Linear transmittance (550 nm) |
|---|---|---|---|---|---|
| Example 20 | 4.5 | 95.5 | 6 | 0.5 | B |
| Example 21 | 4.5 | 95.5 | 6 | 1.5 | B |
| Example 22 | 2 | 98 | 6 | 0.5 | A |
| Example 23 | 2 | 98 | 6 | 1.5 | B |

Example B

The present invention is specifically illustrated based on the following examples. The present invention is not limited to these examples.

In the following examples, the intermediate layer coating liquid was prepared by mixing any one of the silicone-modified acrylic resin materials shown below, water and a film-forming auxiliary agent as needed. Details are shown in Table 9.

A silicone-modified acrylic resin dispersion with silicon atom content of 10% by mass relative to the solid content of the silicone-modified resin A silicone-modified acrylic resin dispersion with silicon atom content of 0.2% by mass relative to the solid content of the silicone-modified resin A silicone-modified acrylic resin dispersion with silicon atom content of 16.5% by mass relative to the solid content of the silicone-modified resin

TABLE 9

| | Silicon atom content in the silicone-modified acrylic resin (% by mass) |
|---|---|
| M-1 | 10 |
| M-2 | 0.2 |
| M-3 | 16.5 |

In the following examples, the photocatalytic layer coating liquid was prepared by mixing the photocatalytic particles shown below, any one of the inorganic oxides and water as needed. Details are shown in Table 10.

Photocatalytic Particles

Titania water dispersion (Average particle diameter: 42 nm, basic)

Inorganic Oxide Particles

Water dispersed colloidal silica (Average particle diameter: 14 nm, basic)

Water dispersed colloidal silica (Average particle diameter: 26 nm, basic)

Water dispersed colloidal silica (Average particle diameter: 5 nm, basic)

Hydrolyzable Silicone

Polycondensation product of tetramethoxysilane (concentration in terms of $SiO_2$: 51% by mass, Solvent: methanol and water)

Surfactant

Polyether modified silicone-based surfactant

TABLE 10

|  | Photocatalyst content (parts by mass) | Colloidal silica content (parts by mass) | Colloidal silica average particle diameter (nm) | Surface-active agent (parts by mass) | Hydrolyzable silicate content in terms of SiO$_2$ (parts by mass) |
|---|---|---|---|---|---|
| T-1 | 4.5 | 95.5 | 14 | 6 | 0 |
| T-2 | 10 | 90 | 14 | 6 | 0 |
| T-3 | 20 | 80 | 14 | 6 | 0 |
| T-4 | 30 | 70 | 14 | 6 | 0 |
| T-5 | 2 | 98 | 14 | 6 | 0 |
| T-6 | 1 | 99 | 14 | 6 | 0 |
| T-7 | 4.5 | 95.5 | 26 | 6 | 0 |
| T-8 | 4.5 | 95.5 | 5 | 6 | 0 |
| T-9 | 4.5 | 90.5 | 14 | 6 | 5 |
| T-10 | 4.5 | 85.5 | 14 | 6 | 10 |

Examples 31 to 33

Evaluation of Weather Resistance (Outdoor Exposure)

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 9 and dried at 120° C. to obtain the intermediate layer. The solid concentration of the resin in the M-1 solution was about 20%. The film thickness of the intermediate layer measured by scanning electron microscopic observation was about 10 μm for any of Examples 31 to 33.

Meanwhile, the titania water dispersion as the photocatalyst, the water dispersed colloidal silica as the inorganic oxide, water as the solvent, and the surfactant were mixed in the compounding ratio shown in T-1 to T-3 of Table 10 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 31 to 33. In this way, the intermediate layer and the photocatalytic layer were formed to obtain the photocatalyst-coated body.

The photocatalyst-coated body of the size of 50×100 nm thus obtained was subjected to outdoor exposure at the elevation angle of 20° and facing south using an exposure rack defined in JIS K 5600-7-6 in Miyakojima Island. The external appearance was confirmed by visual observation every three months.

The results obtained are shown in Table 11. "G" in the Table represents little change and "NG" represents occurrence of slight efflorescence. As shown in Table 11, it was found that sufficient weather resistance is attained in Miyakojima Island by using the photocatalytic layer comprising less than 5 parts by mass of the photocatalyst.

TABLE 11

|  | Intermediate Layer | Photocatalytic Layer | Appearance Change 3 months | 6 months |
|---|---|---|---|---|
| Example 31 | M-1 | T-1 | G | G |
| Example 32 | M-1 | T-2 | G | NG |
| Example 33 | M-1 | T-3 | NG | NG |

Examples 34 to 36

Evaluation of Hydrophilicity after Ultraviolet Exposure

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 9 and dried at 120° C. to obtain the intermediate layer. The solid concentration of the resin in the M-1 solution was about 20%. The film thickness of the intermediate layer measured by scanning electron microscopic observation was about 10 μm for any of Examples 34 to 36.

Meanwhile, the titania water dispersion as the photocatalyst, the water dispersed colloidal silica as the inorganic oxide, water as the solvent, and the surfactant were mixed in the compounding ratio shown in T-1, T-5 and T-6 of Table 9 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 34 to 36. In this way, the intermediate layer and the photocatalytic layer were formed to obtain the photocatalyst-coated body.

The hydrophilicity was evaluated for the photocatalyst-coated body thus obtained as follows. The photocatalyst-coated body was cured in a dark place for 1 day and allowed to stand under the BLB light adjusted at 1 mW/cm$^2$ with the photocatalyst painted surface facing upward for 7 days. The contact angle of the photocatalyst painted surface was measured by a contact angle meter (CA-X150 Type manufactured by Kyowa Interface Science Co., Ltd.). The measurement of the contact angle was to substitute hydrophilicity.

The results obtained are shown in Table 12. The evaluation criteria of the hydrophilicity after ultraviolet exposure are as follows.

[Hydrophilicity]

A: Contact angle less than 10°

B: Contact angle 10° or more and less than 20°

C: Contact angle 20° or more

As shown in Table 12, it was found that the high hydrophilicity was secured by using the photocatalytic layer comprising 2 parts by mass or more of the photocatalytic particles.

TABLE 12

| | Intermediate layer | Photocatalytic layer | Hydrophilicity |
|---|---|---|---|
| Example 34 | M-1 | T-5 | B |
| Example 35 | M-1 | T-1 | A |
| Example 36 | M-1 | T-6 | C |

Examples 37 and 38

Evaluation of Sliding Abrasion Resistance

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 9 and dried at 120° C. to obtain the intermediate layer. The solid concentration of the resin in the M-1 solution was about 20%. The film thickness of the intermediate layer measured by scanning electron microscopic observation was about 10 µm for any of Examples 37 and 38.

Meanwhile, the titania water dispersion as the photocatalyst, the water dispersed colloidal silica as the inorganic oxide, water as the solvent, and the surfactant were mixed in the compounding ratio shown in T-1 and T-7 of Table 10 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 µm for any of Examples 37 and 38. In this way, the intermediate layer and the photocatalytic layer were formed to obtain the photocatalyst-coated body.

The washing resistance test for the photocatalyst-coated body thus obtained was performed as follows. The test method was according to JIS A6909. The photocatalyst-coated body was horizontally fixed on a test rack of a washability apparatus (Washability Tester No. 458 manufactured by Toyo Seiki Seisaku-sho, Ltd.) with the photocatalyst painted surface facing upward. A pig bristle brush of a dry weight of 450 g was put on the photocatalyst painted surface after the bristles were immersed in an aqueous soap solution of 0.5% and reciprocated 500 times. Then the photocatalytic painted body was removed, washed with water and dried.

After irradiating the thoroughly dried photocatalyst-coated body with BLB light adjusted at 3 mW/cm² for 24 hours, the contact angle of the photocatalyst painted surface was measured by a contact angle meter (CA-X150 Type manufactured by Kyowa Interface Science Co., Ltd.). The measurement of the contact angle was to substitute hydrophilicity.

The results obtained are shown in Table 13. The evaluation criteria of the sliding abrasion resistance are as follows.

[Sliding Abrasion Resistance]

A: Contact angle less than 10°

B: Contact angle 10° or more

As shown in Table 13, it was found that the photocatalyst-coated body of Example 37 formed a strong film against sliding.

TABLE 13

| | Intermediate layer | Photocatalytic layer | Sliding abrasion resistance |
|---|---|---|---|
| Example 37 | M-1 | T-1 | A |
| Example 38 | M-1 | T-7 | B |

Examples 39 and 40

Measurement of Haze

The photocatalyst-coated body comprising the photocatalytic layer was produced as follows. First, a float plate glass having transmittance of 94% at the wavelength of 550 nm was used as the substrate. Meanwhile, the titania water dispersion as the photocatalyst, the water dispersed colloidal silica as the inorganic oxide, water as the solvent, and the surfactant were mixed in the compounding ratio shown in T-1 and T-8 of Table 10 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned substrate was spin coated by the photocatalytic coating liquid obtained at 1000 rpm for 10 seconds, followed by drying at 120° C. to obtain the photocatalytic layer. Haze of the photocatalyst-coated body of the size of 50×100 mm thus obtained was measured using a haze meter (Haze-Gard Plus manufactured by Paul N. Gardner Company, Inc.).

The results obtained are shown in Table 14. It was found that the photocatalyst-coated body of Example 39 was suppressed the haze to less than 1% and the transparency was secured.

TABLE 14

| | Photocatalytic layer | Silica particle average particle diameter (nm) | Haze (%) |
|---|---|---|---|
| Example 39 | T-1 | 14 | 0.62 |
| Example 40 | T-8 | 5 | 1.25 |

Examples 41 to 44

Evaluation of Harmful Gas Decomposition Activity

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 9 and dried at 120° C. to obtain the intermediate layer. The solid concentration of the resin in the M-1 solution was about 20%. The film thickness of the intermediate layer measured by scanning electron microscopic observation was about 10 µm for any of Examples 41 to 44.

Meanwhile, the titania water dispersion as the photocatalyst, the water dispersed colloidal silica as the inorganic oxide, water as the solvent, and the surfactant were mixed in the compounding ratio shown in T-1, T-2 and T-5 of Table 10 to obtain the photocatalytic coating liquid. The photocatalytic coating liquid does not comprise the hydrolyzable silicone.

The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation is shown in Table 15. In this way, the intermediate layer and the photocatalytic layer were formed to obtain the photocatalyst-coated body.

The gas decomposition activity test of thus obtained photocatalyst-coated body of size the 50×100 mm was performed as follows. The photocatalyst-coated body was irradiated with BLB light of 1 mW/cm² for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm² with the introduced gas present. Then the reaction vessel was light shielded again with the introduced gas present. The NOx removal was calculated from the concentrations of NO and NO₂ before and after BLB light irradiation according to the following equation.

NOx Removal=[NO(after irradiation)−NO(at irradiation)]−[NO₂(at irradiation)−NO₂(after irradiation)]

The results obtained are shown in Table 15. As shown in Table 15, it was found that the sufficient NOx decomposition activity was attained even if the content of the photocatalytic particles in the photocatalytic layer was less than 5 parts by mass.

TABLE 15

| | Intermediate layer | Photocatalytic layer | Film thickness (μm) | NOx removal (Example 14 = 100) |
|---|---|---|---|---|
| Example 41 | M-1 | T-1 | 0.5 | 51 |
| Example 42 | M-1 | T-1 | 1 | 97 |
| Example 43 | M-1 | T-5 | 1.5 | 56 |
| Example 44 | M-1 | T-2 | 0.5 | 100 |

Examples 45 to 47

Influence of Hydrolyzable Silicone

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 9 and dried at 120° C. to obtain the intermediate layer. The solid concentration of the resin in the M-1 solution was about 20%. The film thickness of the intermediate layer measured by scanning electron microscopic observation was about 10 μm for any of Examples 45 to 47.

Meanwhile, the titania water dispersion as the photocatalyst, the water dispersed colloidal silica as the inorganic oxide, water as the solvent, and the surfactant were mixed in the compounding ratio shown in T-1, T-9 and T-10 of Table 10 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 45 to 47. In this way, the intermediate layer and the photocatalytic layer were formed to obtain the photocatalyst-coated body.

The gas decomposition activity test of thus obtained photocatalyst-coated body of size the 50×100 mm was performed as follows. The photocatalyst-coated body was irradiated with BLB light of 1 mW/cm² for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm² with the introduced gas present. Then the reaction vessel was light shielded again with the introduced gas present. The NOx removal was calculated from the concentrations of NO and NO₂ before and after BLB light irradiation according to the following equation.

NOx Removal=[NO(after irradiation)−NO(at irradiation)]−[NO₂(at irradiation)−NO₂(after irradiation)]

The results obtained are shown in Table 16. NOx removal in Example 45, in which the hydrolyzable silicone was not comprised at all, is taken as 100. Other examples of 50 or more and less than 50, relative to Example 45, are expressed as G and NG, respectively. As shown in Table 16, the photocatalytic layer composed of the photocatalytic particles and the inorganic oxides and comprising essentially no hydrolyzable silicone exhibited an excellent NOx decomposition activity. On the other hand, it was found that the sample comprising 10 parts by mass of the hydrolyzable silicone lost the NOx decomposition activity.

TABLE 16

| | Intermediate layer | Photocatalytic layer | Hydrolyzed silicate content converted to SiO₂ (parts by mass) | Nox removal (Example 15 = 100) |
|---|---|---|---|---|
| Example 45 | M-1 | T-1 | 0 | G (100) |
| Example 46 | M-1 | T-9 | 5 | G (85) |
| Example 47 | M-1 | T-10 | 10 | NG (40) |

Examples 48 to 51

Measurement of Linear Transmittance

The photocatalyst-coated body comprising the photocatalytic layer was produced as follows. First, a float plate glass having transmittance of 94% at the wavelength of 550 nm was prepared as the substrate. Meanwhile, the titania water dispersion as the photocatalyst, the water dispersed colloidal silica as the inorganic oxide, water as the solvent, and the surfactant were mixed in the compounding ratio shown in T-1 and T-5 of Table 10 to obtain the photocatalytic coating liquid. Therefore, the photocatalytic coating liquid does not comprise the hydrolyzable silicone. The total solid concentration of the photocatalyst and the inorganic oxide in the photocatalytic coating liquid was 5.5% by mass.

The aforementioned float plate glass which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation is shown in Table 17.

The measurement of linear (550 nm) transmittance for the photocatalyst-coated body of the size of 50×100 mm thus obtained was performed using an ultraviolet-visible-near infrared spectrophotometer (UV-3150 manufactured by Shimadzu Corporation).

The results obtained are shown in Table 17. The evaluation criteria of the linear transmittance are as follows.

[Linear Transmittance]
A: Linear (550 nm) transmittance 95% or more
B: Linear (550 nm) transmittance 90% or more and less than 95%

The photocatalyst-coated bodies in Table 17 showed high transparency.

TABLE 17

|  | Photocatalytic Layer | Film Thickness (μm) | Linear Transmittance (550 nm) |
| --- | --- | --- | --- |
| Example 48 | T-1 | 0.5 | B |
| Example 49 | T-1 | 1.5 | B |
| Example 50 | T-5 | 0.5 | A |
| Example 51 | T-5 | 1.5 | B |

Examples 52 to 54

Evaluation of Weather Resistance of Painted Film-1

The photocatalyst-coated body comprising the intermediate layer and the photocatalytic layer was produced as follows. First, a float plate glass was prepared as the substrate. The preheated glass substrate was spray-coated with the mixture of the intermediate layer coating liquid described in M-2 of Table 9 and a colored pigment and dried at 120° C. to obtain the intermediate layer. The solid concentration of the resin in the M-2 solution was about 20%. The film thickness of the intermediate layer measured by scanning electron microscopic observation was about 10 μm for any of Examples 52 to 54.

Meanwhile, the titania water dispersion as the photocatalyst, the water dispersed colloidal silica as the inorganic oxide, and water as the solvent were mixed in the compounding ratio shown in T-1, T-4 and T-5 of Table 10 to obtain the photocatalytic coating liquid. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 52 to 54. In this way, the intermediate layer and the photocatalytic layer were formed to obtain the photocatalyst-coated body.

The weather resistance test for the photocatalyst-coated body of the size of 50×100 mm thus obtained was performed as follows. The photocatalyst-coated body was put into a sunshine weatherometer (S-300C manufactured by Suga Test Instruments Co., Ltd.) defined in JIS B7753. The sample was taken out after 300 hours and the color difference before and after the acceleration test was measured using a color difference meter ZE2000 manufactured by Nippon Denshoku Industries Co., Ltd. The degree of discoloration was evaluated by comparing the Δb values.

The results obtained are shown in Table 18. "G" in the table represents little discoloration and "NG" represents that the Δb value transited to plus side (yellowing side). As shown in Table 18, it was found that the photocatalyst-coated bodies of Examples 52 and 53 have sufficient weather resistance even if the intermediate layer comprising a small amount of silicon atom is painted with the photocatalytic layer.

TABLE 18

|  | Intermediate layer | Photocatalytic layer | Photocatalyst content in photocatalytic layer (parts by mass) | Δb |
| --- | --- | --- | --- | --- |
| Example 52 | M-2 | T-1 | 4.5 | G |
| Example 53 | M-2 | T-5 | 2 | G |
| Example 54 | M-2 | T-4 | 30 | NG |

Example 55 and 56

Evaluation of Weather Resistance of Painted Film-2

The photocatalyst-coated body comprising the intermediate layer and the photocatalytic layer was produced as follows. First, a zinc-plated steel sheet painted with a general-purpose epoxy resin primer and dried was prepared as the substrate. The substrate was spray-coated with the intermediate layer coating liquid described in M-1 and M-3 of Table 9 and dried at 120° C. to obtain the intermediate layer. The solid concentration of the resin in the M-1 and M-2 solutions was about 20%. The film thickness of the intermediate layer measured by scanning electron microscopic observation was about 10 μm for any of Examples 55 using M-1 and Example 56 using M-3.

Meanwhile, the titania water dispersion as the photocatalyst, the water dispersed colloidal silica as the inorganic oxide, water as the solvent, and the surfactant were mixed in the compounding ratio shown in T-1 of Table 10 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 55 and 56. In this way, the intermediate layer and the photocatalytic layer were formed to obtain the photocatalyst-coated body.

The weather resistance test for the photocatalyst-coated body of the size of 50×100 mm thus obtained was performed as follows. The photocatalyst-coated body was put into a metaling weatherometer (M6T manufactured by Suga Test Instruments Co., Ltd.) and the external appearance was confirmed after 150 hours.

In Example 55 in which the acrylic modified silicone resin comprising 10% by mass of silicon atom was used, cracks did not occur and good weather resistance was attained. On the other hand, in Example 56 in which the acrylic modified silicone resin comprising 16.5% by mass of silicon atom was used, partial occurrence of cracks was observed albeit only slightly.

What is claimed is:

1. A photocatalyst-coated body comprising a substrate and a photocatalytic layer provided on the substrate,
the photocatalytic layer comprising photocatalytic particles and inorganic oxide particles and,
the photocatalytic layer having interstices between the particles in the layer, wherein the photocatalytic layer comprises:
the photocatalytic particles in an amount of more than 1 part by mass and less than 5 parts by mass,
the inorganic oxide particles in an amount of more than 85 parts by mass and less than 99 parts by mass, and
a dried substance of a hydrolyzable silicone in terms of silica in an amount of 0 part by mass or more and less than 10 parts by mass,
provided that the photocatalytic particles, the inorganic oxide particles, and the hydrolyzable silicone in terms of silica amount to 100 parts by mass, and
wherein the substrate has at least a surface which is formed of an organic material.

2. The photocatalyst-coated body according to claim 1, wherein an average particle diameter of the photocatalytic particles is 10 nm or more and 100 nm or less.

3. The photocatalyst-coated body according to claim 1, wherein the photocatalytic particles are titanium oxide particles.

4. The photocatalyst-coated body according to claim 1, wherein the photocatalytic particles are anatase-type titanium oxide.

5. The photocatalyst-coated body according to claim 1, wherein Cu further exists in the photocatalytic layer.

6. The photocatalyst-coated body according to claim 1, further comprising Cu which is supported on the photocatalytic particles.

7. The photocatalyst-coated body according to claim 1, wherein Cu and Ag further exist in the photocatalytic layer.

8. The photocatalyst-coated body according to claim 7, wherein the Ag and Cu are supported on the photocatalytic particles.

9. The photocatalyst-coated body according to claim 1, wherein the inorganic oxide particles are silica particles.

10. The photocatalyst-coated body according to claim 1, wherein the inorganic oxide particles have a number average particle diameter of 5 nm or more and less than 40 nm calculated by measuring a length of arbitrary 100 particles within a visual field of a scanning electron microscope with 200,000× magnification.

11. The photocatalyst-coated body according to claim 1, wherein the inorganic oxide particles have a number average particle diameter of more than 5 nm and 20 nm or less calculated by measuring a length of arbitrary 100 particles within a visual field of a scanning electron microscope with 200,000× magnification.

12. The photocatalyst-coated body according to claim 1, wherein the photocatalytic layer further comprises a surfactant in an amount of 0 part by mass or more and less than 10 parts by mass.

13. The photocatalyst-coated body according to claim 1, wherein the photocatalytic layer has a film thickness of 0.5 μm or more and 3 μm or less.

14. The photocatalyst-coated body according to claim 1, wherein the photocatalytic layer further comprises, as an optional component, a hydrolyzed condensation-polymerization product of titanium alkoxide or a derivative of titanium alkoxide in an amount of 0 part by mass or more and less than 10 parts by mass in terms of titanium dioxide.

15. The photocatalyst-coated body according to claim 1, wherein the photocatalytic layer is obtained by applying a coating liquid to the substrate and heat drying at 200° C. or lower.

16. The photocatalyst-coated body according to claim 1, wherein the hydrolyzable silicone is an organosiloxane having at least one reaction group selected from a group of alkoxy groups, halogen groups and hydrogen group.

17. The photocatalyst-coated body according to claim 1, wherein the hydrolyzable silicone is an organosiloxane having an alkoxy group.

18. The photocatalyst-coated body according to claim 1, wherein the dried substance of the hydrolyzable silicone is a hydrolyzed condensation-polymerization product of the hydrolyzable silicone.

19. The photocatalyst-coated body according to claim 1, wherein the photocatalytic layer is directly coated on the substrate.

20. The photocatalyst-coated body according to claim 1, further comprising an intermediate layer provided between the substrate and the photocatalytic layer.

21. The photocatalyst-coated body according to claim 20, wherein the intermediate layer comprises a silicone-modified resin.

22. The photocatalyst-coated body according to claim 20, wherein the intermediate layer comprises an acrylic silicone.

23. The photocatalyst-coated body according to claim 20, wherein the intermediate layer comprises an ultraviolet absorbing agent.

24. The photocatalyst-coated body according to claim 20, wherein the intermediate layer comprises an organic antifungal agent.

25. The photocatalyst-coated body according to claim 1 for use as an exterior material.

26. A photocatalytic coating liquid for use in producing the photocatalyst-coated body according to claim 1, the photocatalytic coating liquid comprising:
a solvent,
photocatalytic particles having an average particle diameter of 10 nm or more and 100 nm or less in an amount of 1 part by mass or more and 5 parts by mass or less,
inorganic oxide particles in an amount of more than 85 parts by mass and 99 parts by mass or less, and
a hydrolyzable silicone in terms of silica in an amount of 0 part by mass or more and less than 10 parts by mass,
provided that the photocatalytic particles, the inorganic oxide particles, and the hydrolyzable silicone amount to 100 parts by mass in terms of silica.

27. The photocatalytic coating liquid according to claim 26, wherein an average particle diameter of the photocatalytic particles is 10 nm or more and 100 nm or less.

28. The photocatalytic coating liquid according to claim 26, wherein the photocatalytic particles are titanium oxide particles.

29. The photocatalytic coating liquid according to claim 26, wherein the photocatalytic particles are anatase-type titanium oxide.

30. The photocatalytic coating liquid according to claim 26, further comprising Cu.

31. The photocatalytic coating liquid according to claim 26, further comprising Cu and Ag.

32. The photocatalytic coating liquid according to claim 30, wherein Cu is supported on the photocatalytic particles.

33. The photocatalytic coating liquid according to claim 31, wherein Ag and Cu are supported on the photocatalytic particles.

34. The photocatalytic coating liquid according to claim 26, wherein the inorganic oxide particles are silica particles.

35. The photocatalytic coating liquid according to claim 26, wherein the inorganic oxide particles have a number average particle diameter of 5 nm or more and less than 40 nm calculated by measuring a length of arbitrary 100 particles within a visual field of a scanning electron microscope with 200,000× magnification.

36. The photocatalytic coating liquid according to claim 26, wherein the inorganic oxide particles have a number average particle diameter of more than 5 nm and 20 nm or less calculated by measuring a length of arbitrary 100 particles within a visual field of a scanning electron microscope with 200,000× magnification.

37. The photocatalytic coating liquid according to claim 26, further comprising a surfactant in an amount of 0 part by mass or more and less than 10 parts by mass.

38. The photocatalytic coating liquid according to claim 26, further comprising, as an optional component, a hydrolyzed condensation-polymerization product of titanium alkoxide or a derivative of titanium alkoxide in an amount of 0 part by mass or more and less than 10 parts by mass in terms of titanium dioxide.

39. The photocatalytic coating liquid according to claim 26, wherein the hydrolyzable silicone is an organosiloxane having at least one reactive group selected from a group of alkoxy groups, halogen groups and hydrogen group.

40. The photocatalytic coating liquid according to claim 26, wherein the hydrolyzable silicone is an organosiloxane having an alkoxy group.

41. The photocatalytic coating liquid according to claim 26, wherein the solvent is water.

42. A coating liquid for forming the intermediate layer of the photocatalyst-coated body according to claim 20, comprising a solvent and a silicone-modified resin.

43. The coating liquid according to claim 42, wherein the silicone-modified resin is an acrylic silicone.

44. The coating liquid according to claim 42, further comprising an ultraviolet absorbing agent.

45. The coating liquid according to claim 42, further comprising an organic antifungal agent.

46. The coating liquid according to claim 42, wherein the solvent is water.

47. The photocatalyst-coated body according to claim 1, wherein the photocatalytic layer is provided on the substrate surface formed of the organic material.

* * * * *